US006072889A

United States Patent [19]
Deaett et al.

[11] Patent Number: 6,072,889
[45] Date of Patent: Jun. 6, 2000

[54] METHOD AND SYSTEM FOR IMAGING TARGET DETECTION

[75] Inventors: Michael A. Deaett, North Kingstown, R.I.; Erik J. DeGraaf, Derry, N.H.; Stephen G. Johnson, Little Compton, R.I.; Melinda L. Norcross, Hudson; Anthony J. Pawlak, Manchester, both of N.H.

[73] Assignee: The Raytheon Company, Lexington, Mass.

[21] Appl. No.: 08/984,592

[22] Filed: Dec. 3, 1997

[51] Int. Cl.$^7$ ........................................... G06K 9/00
[52] U.S. Cl. ............................... 382/103; 342/62
[58] Field of Search ..................... 382/103, 173, 382/180, 190; 342/62; 244/3.16, 3.17; 250/203.1, 203.3, 203.6, 202

[56] References Cited

U.S. PATENT DOCUMENTS

| | | | |
|---|---|---|---|
| 4,905,292 | 2/1990 | Wentworth et al. | 382/1 |
| 5,027,413 | 6/1991 | Barnard | 382/1 |
| 5,265,173 | 11/1993 | Griffin et al. | 382/22 |
| 5,341,143 | 8/1994 | Reis et al. | 342/64 |
| 5,430,445 | 7/1995 | Peregrim et al. | 342/25 |
| 5,493,539 | 2/1996 | Haley et al. | 367/88 |
| 5,602,760 | 2/1997 | Chacon et al. | 364/516 |
| 5,612,928 | 3/1997 | Haley et al. | 367/11 |

OTHER PUBLICATIONS

"Are higher performance image processors, like GAPP™, really needed?" by Eugene Cloud, Herbert Duvoisin, III, Robert Jackson, and Mark Tomassi: P. 218–224; SPIE vol. 2368 Image and Information Systems (1994).

"Dual color radiometer imagery and test results" by Alan Silver, Frank Carlen, David Link, and Ferdinand Zegal: p. 39–63; SPIE vol. 1109 Optical Radiation Measurements II (1989).

"New Directions in Missile Guidance: Signal Processing Based on Neural Networks and Fractal Modeling" by Bradely Boone, Kim Contantikes, Robert Fry, Allen Gilbert, and Robert Kulp: p. 28–36; *John Hopkins APL Technical Digest*, vol. 11, Nos. 1 and 2 (1990).

"A Fuzzy Logic Rule–Based Automatic Target Recognizer" by Asghar Nafarieh and James Keller: p. 295–312; *International Journal of Intelligent Systems*, vol. 6.(1991).

"Signal Processing For Missile Guidance: Prospects for the Future" by Bradley Boone and Richard Steinberg: p. 269–275; *Johns Hopkins APL Technical Digest*, vol. 9 No. 3 (1988).

"Multisensor Image Analysis System" (Unclassified Technical Report distributed by DTIC) by Dr. G.M. Flanchs, Dr. Michael Giles, Dr. Jay Jordan, Dr. Eric Johnson, and Dr. Ramon Parra: U.S. Army Research Office Apr. 15, 1993 p. 1–45.

*Primary Examiner*—Andrew W. Johns
*Attorney, Agent, or Firm*—Iandiorio & Teska

[57] ABSTRACT

A system and method for imaging target detection includes scanning a target area to produce an image of the target area and discriminating a target by identifying image pixels of similar intensity levels, grouping contiguous pixels with similar intensity levels into regions, calculating a set of features for each region and qualifying regions as possible targets in response to the features; discriminating the background by identifying image pixels of similar intensity levels, grouping contiguous pixels of similar intensity levels into regions, calculating a set of features for each background region and qualifying background regions as terrain characteristics in response to the features and analyzing the qualified terrain characteristics and qualified target candidates to determine and prioritize targets.

24 Claims, 17 Drawing Sheets

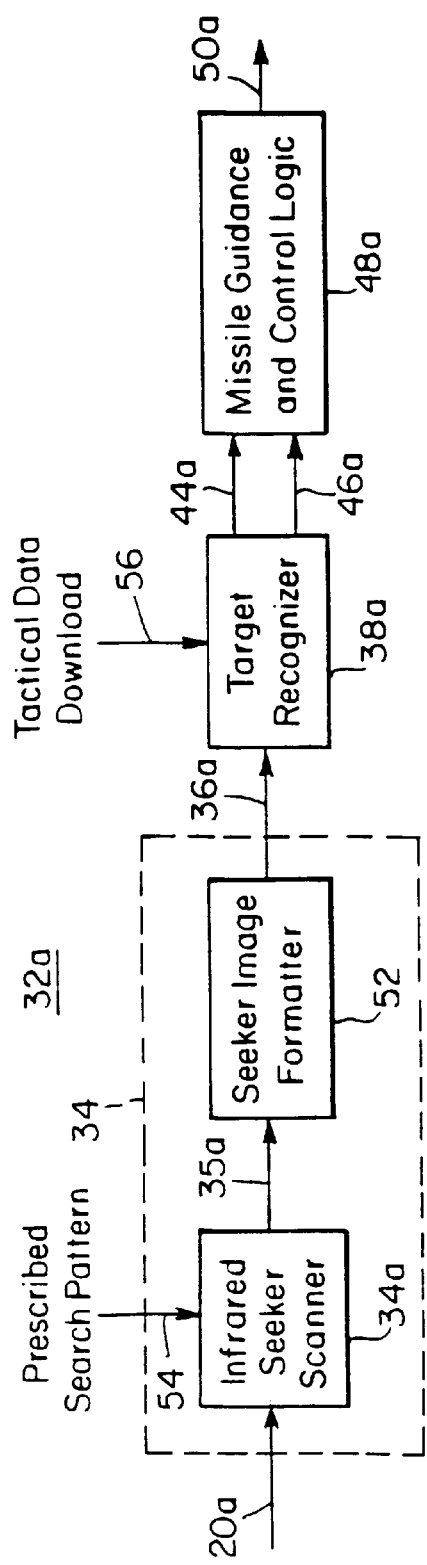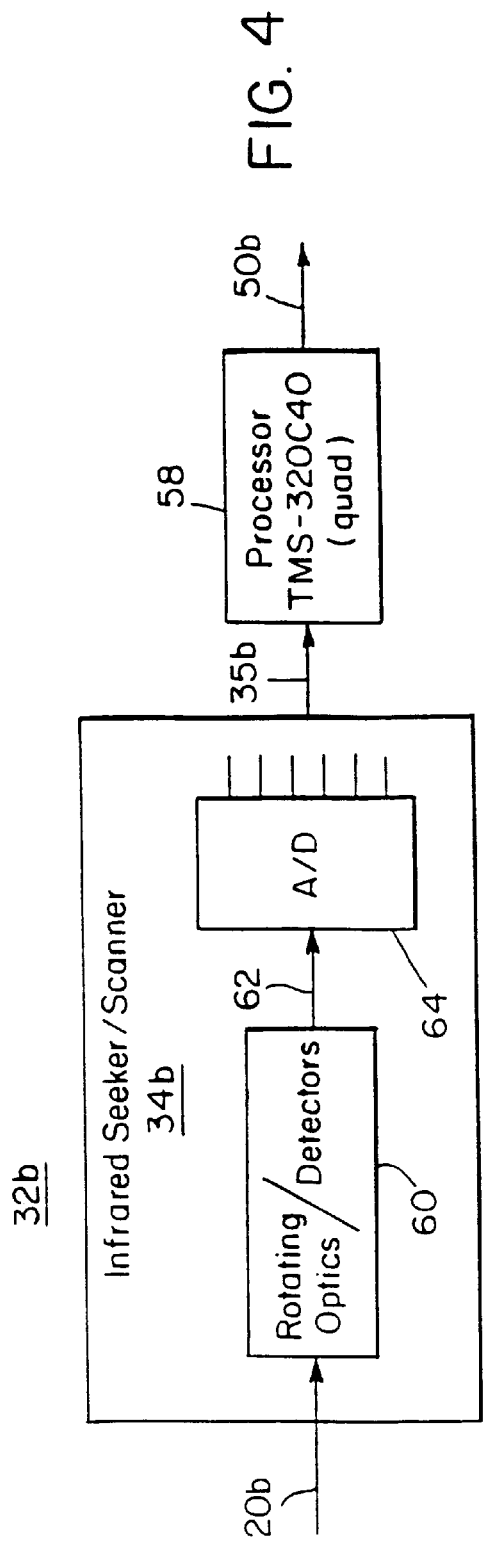
FIG. 3
FIG. 4

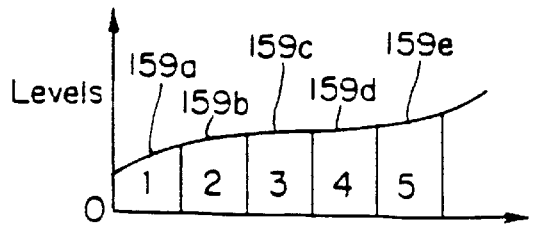

FIG. 13B

```
for all regions, k,
passing initial area test                                    164
        ────────────────────
              Region Selection Criteria
        if(
            16<=area[k]<=32,
            abs(snr.global[k])=>1.0,
            abs(snr.local[k])=>0.85,
            abs(snr.bdd.rectangle[k])=>0.5,
            abs(snr.peak[k])=>1.45,
            abs(snr.clutter[k])=>6.0,
            Shape.spread[k]<=1.5,
            elipse.shapefactor[k]<=0.85,
            shape.ESnA[k]=>0.55
        } then candidate flag=true;

for all regions, i, candidate flag=true
    for all regions, j, candidate flag=true
              Region Association and Deselection
        if{
            region.snr[j]>region.snr[i] and bddRect[j]
            contains centroid[i], } then deselect region i, if{
            region.snr[i]>region.snr[j] and bddRect[i]
            contains centroid[j], } then deselect region j,
```

FIG. 14

METHOD AND SYSTEM FOR IMAGING TARGET DETECTION

FIELD OF INVENTION

This invention relates to a method and system for autonomous target detection and prioritization using two-color infra-red imagery.

BACKGROUND OF INVENTION

Infrared seeker systems are used in autonomous missile targeting systems for automatically selecting target objects in a cluttered background. Some munitions are free-falling aerodynamically steered vehicles having a small warhead which must be placed precisely on a target.

These missiles or munitions are small devices typically having a 5" diameter housing and approximately 100 cubic inch volume. Given their size, they must be able to process target data using a minimum amount of hardware so that it will fit inside the physical housing. However, the processor also must be fast enough to process the target information in only a few seconds as the missile or munition moves toward its target. In addition, since these vehicles are expendable the costs of the processor must be kept as low as possible.

There are three phases of the targeting process: acquisition, tracking and hit placement. Each phase relies on information from the previous phase of processing. This processing must be accurate at each phase because once the missile or munition is launched, no further communication with it is possible.

One problem with an infrared seeking system is that it can be difficult to discriminate between the target and background clutter. Clutter includes weather conditions such as fog, and the existence of countermeasures such as flares and jamming devices, all of which tend to obscure the desired target within the surrounding background. To reduce the effect of this problem, training data is collected on a variety of background terrain to provide image patterns which can help to guide the missile or munition. Given that any one location can experience a wide variety of weather conditions and that the training data for each weather condition also contains data associated with a specific target, the amount of training data required for accurate targeting quickly becomes too large for the missile or munition to sort and process in an appropriately short period of time.

Some weather conditions add to the confusion in being able to differentiate a target from something which is a part of the terrain. There may be times when certain environments emit an average background radiation level which is very close to that of a target. For example, a collection of rocks which have been in the sun at certain times of the day may be detected as hot spots and may be mistaken for targets.

Infrared seekers have also typically been designed to detect objects which are hot, for example, tanks which are currently operating. Cold targets such as tanks which have been sitting idle for a while and which have had time to cool off present a much more difficult problem for infrared seekers.

SUMMARY OF INVENTION

It is therefore an object of this invention to provide an improved method and system for imaging target detection.

It is a further object of this invention to provide such a method and system for imaging target detection which can distinguish both hot and cold targets from background clutter.

It is a further object of this invention to provide such a method and system for imaging target detection which requires less training data.

It is a further object of this invention to provide such a method and system for imaging target detection which distinguishes and avoids targeting countermeasures such as flares.

It is a further object of this invention to provide such a method and system for imaging target detection which provides improved target discrimination against both operating and nonoperating infrared targets.

It is a further object of this invention to provide such a method and system for imaging target detection which detects targets having a near zero dB contrast with background clutter.

It is a further object of this invention to provide such a method and system for imaging target detection which examines patterns of the background imagery to identify roads that are known by reconnaissance to be associated with military targets.

It is a further object of this invention to provide such a method and system for imaging target detection which employs a Viterbi feature tracker to detect road edges.

It is a further object of this invention to provide such a method and system for imaging target detection which provides fusion of multiple look independently detected image data utilizing circular scan coordinates.

It is a further object of this invention to provide such a method and system for imaging target detection which is processing efficient and therefore implementable within the size and power constraints of a self-guided missile.

It is a further object of this invention to provide such a method and system for imaging target detection which provides confidence scores for prioritizing detected targets.

This invention results from the realization that a truly compact, efficient and highly reliable target detection system can be effected by generating an image of a target area, independently discriminating targets and background, then merging prequalified possible targets and terrain characteristics and evaluating them to identify targets and assign confidence levels to the targets; and from further using Viterbi tracking to confirm the reliability of identified terrain characteristics.

This invention features an imaging target detection system including scanner means for producing an image of a target area. There is a target discriminator means including target segmentation means for identifying image pixels of similar intensity levels, a target regionalization means for grouping contiguous pixels of similar intensity levels into regions, and means for calculating a set of features for each target region, and means for qualifying regions as possible targets in response to the features. There is background discrimination means including background segmentation means for identifying image pixels of similar intensity levels, background regionalization means for grouping contiguous pixels of similar intensity levels into regions, means for calculating a set of features for each background region and means for qualifying background regions as terrain characteristics in response to the features. There is image analysis logic means responsive to the qualified terrain characteristics and qualified target candidates for determining and prioritizing targets.

In a preferred embodiment the target discriminator means may include a cumulative distribution function segmentation means. The background discriminator means may include vector quantization segmentation means. The means for calculating a set of features for each target region may include means for eliminating regions containing above and below a predetermined number of pixels. The means for calculating a set of features for each background region may include means for eliminating regions above and below a preselected number of pixels. The background discrimination means may include Viterbi tracker means for detecting a track in the pixels of the images, the means for qualifying background regions being responsive to the Viterbi tracker means and the means for calculating a set of features for each background region, for qualifying background regions as terrain characteristics. The scanner means may include a scanning device for providing a signal representative of the target area and geometric transform means for converting the signal into an areal image of the target area. The image may include at least two images of different colors. The different colors may be in the mid and far infrared wavelength. There may be a target discriminator means and a background discriminator means for each color image. The image analysis logic may provide a confidence level for prioritizing targets.

This invention also features a missile imaging target detection system including scanner means for producing an image of a target area. There is a target discriminator means including target segmentation means for identifying image pixels of similar intensity levels, a target regionalization means for grouping contiguous pixels of similar intensity levels into regions, means for calculating a set of features for each target region, and means for qualifying regions as possible targets in response to the features. There is background discrimination means including background segmentation means for identifying image pixels of similar intensity levels, background regionalization means for grouping contiguous pixels of similar intensity levels into regions, means for calculating a set of features for each background region and means for qualifying background regions as terrain characteristics in response to the features. There is image analysis logic means responsive to the qualified terrain characteristics and qualified target candidates for determining and prioritizing targets.

This invention also features a method for imaging target detection including scanning a target area to produce an image of the target area and discriminating a target by identifying image pixels of similar intensity levels; grouping contiguous pixels of similar intensity levels into regions; calculating a set of features for each region and qualifying regions as possible targets in response to the features. The background is discriminated by identifying image pixels of similar intensity levels, grouping contiguous pixels of similar intensity levels into regions, calculating a set of features for each background region and qualifying background regions as terrain characteristics in response to the features. The qualified terrain characteristics and qualified target candidates are then analyzed to determine and prioritize targets.

In a preferred embodiment, discriminating a target may include segmenting according to a cumulative distribution function. Discriminating a background may include segmenting a vector quantization. Calculating a set of features for each target region may include eliminating regions which contain above a first predetermined number of pixels and below a second predetermined number of pixels. Calculating a set of features for each background region may include eliminating regions which contain above a first preselected number of pixels and below a second number of preselected number of pixels. Discriminating the background may include Viterbi tracking for detecting a track in the pixel of the images. Qualifying background regions may include correlating the Viterbi tracking and the set of features calculated for each set of background region for qualifying regions as terrain characteristics. The scanning may include producing a signal representative of the target area and geometrically transforming the signal into an image of the target area. The image may include at least two images of different colors. The different colors may be in the mid and far infrared wavelength. Discriminating a target and discriminating a background may be performed for each color image. The analyzing of the prequalified terrain characteristic and qualified targets may include providing a confidence level for prioritizing those targets.

The invention may also feature a method for missile imaging target detection including scanning a target to produce an image thereof and discriminating a target by identifying image pixels of similar intensity levels, grouping contiguous pixels of similar intensity levels into regions, calculating a set of features for each region and qualifying regions as possible targets in response to the features. Discriminating the background may include identifying image pixels of similar intensity levels, grouping contiguous pixels of similar intensity levels into regions, calculating a set of features for each background region and qualifying background regions as terrain characteristics in response to the features. The qualified terrain characteristics and qualified target candidates may be analyzed for determining and prioritizing targets.

DISCLOSURE OF PREFERRED EMBODIMENT

Other objects, features and advantages will occur to those skilled in the art from the following description of a preferred embodiment and the accompanying drawings, in which:

FIG. 3 is a block diagram of an embodiment of the imaging target detection system of FIG. 2;

FIG. 4 is a block diagram of the imaging target detection system of FIG. 2 employing a microprocessor;

FIG. 11A is a mask of a five point median filter;

FIG. 13B is a cumulative distribution function of the pixel intensity value;

FIG. 14 is a flow chart of the target region selection logic used in the imaging target detection system of FIG. 2;

Figure 2:
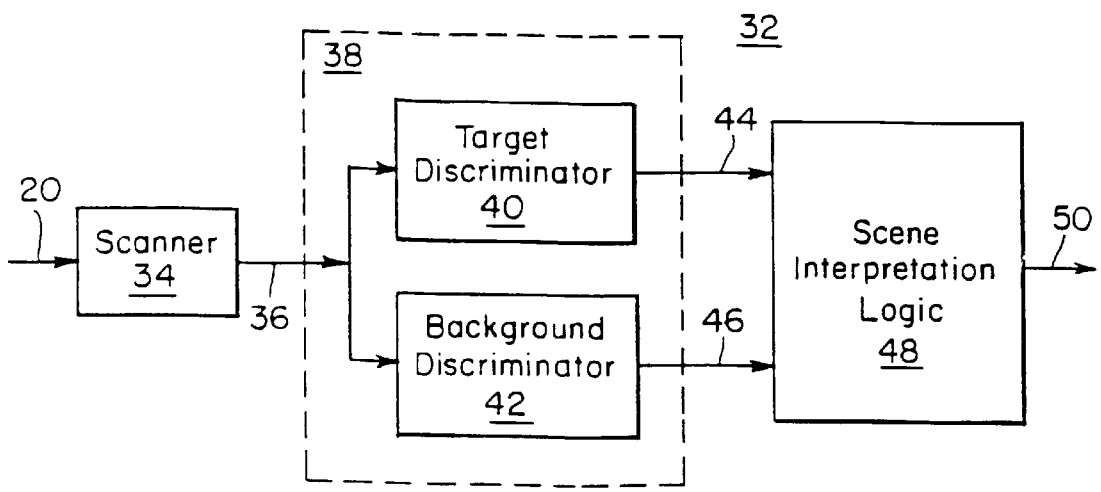
FIG. 2 is a block diagram of an imaging target detection system according to this invention.
Figure 15:
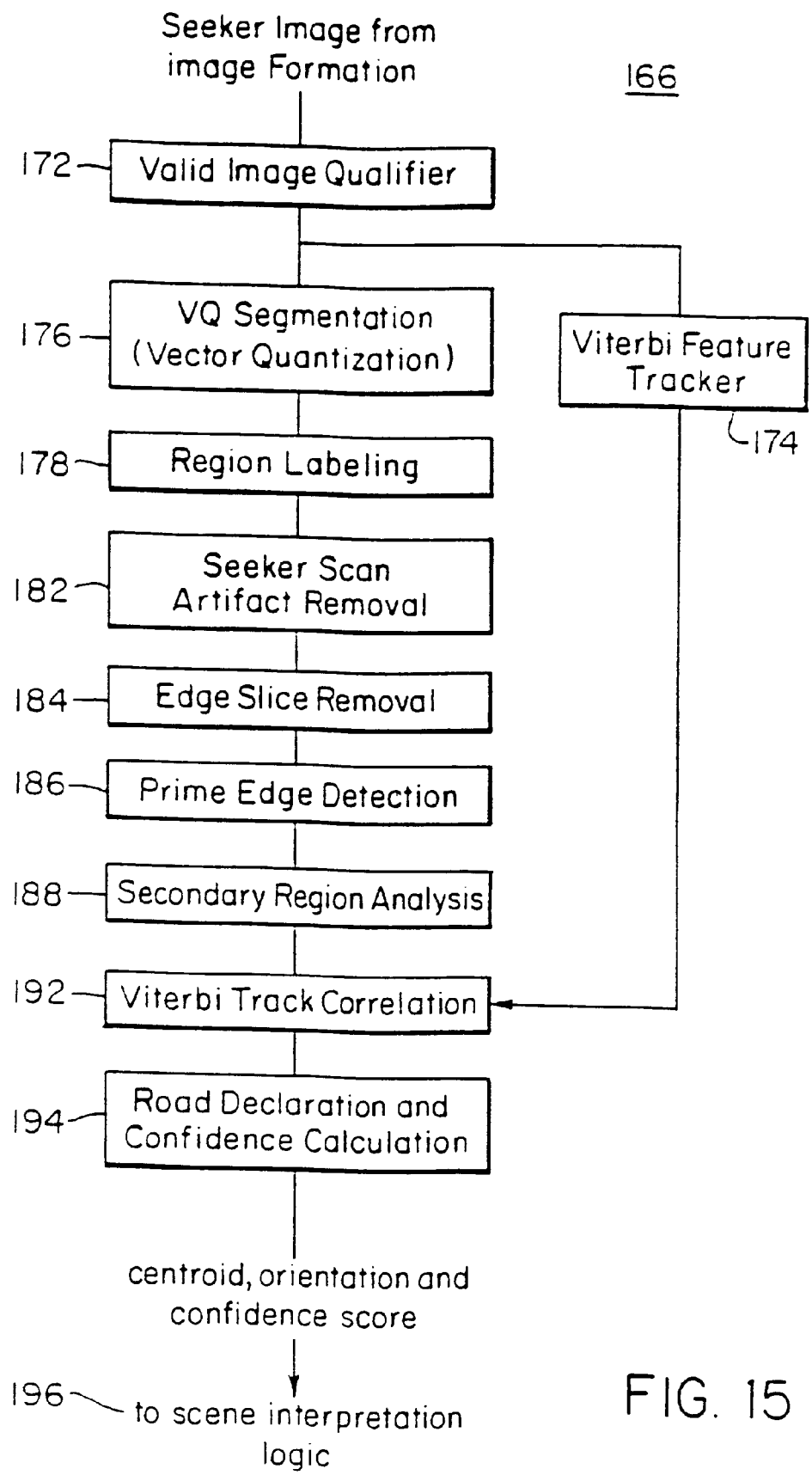
FIG. 15 is a flow chart of the background discriminator logic used to program a microprocessor in the imaging target detection system of FIG. 2.
Figure 15A:
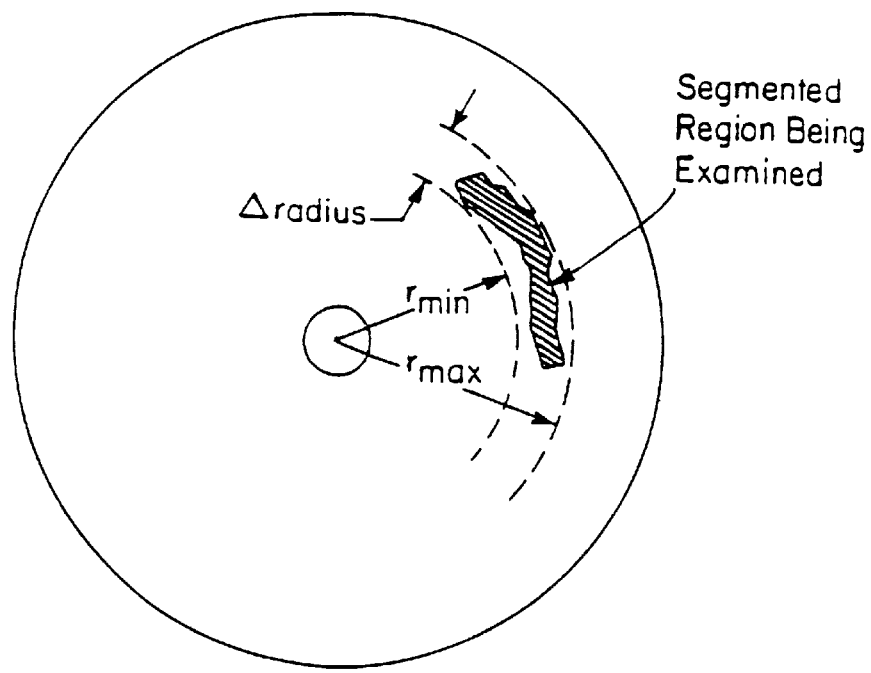
FIG. 15A illustrates a bounding radii calculation for seeker scan artifact removal.
Figure 15B:
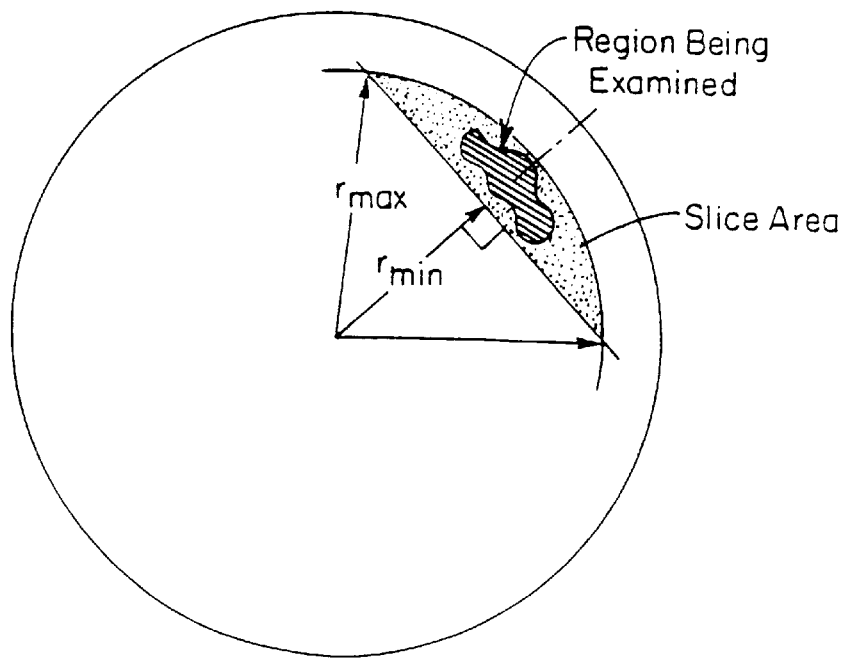
FIG. 15B illustrates a calculation of slice area.
Figure 15C:
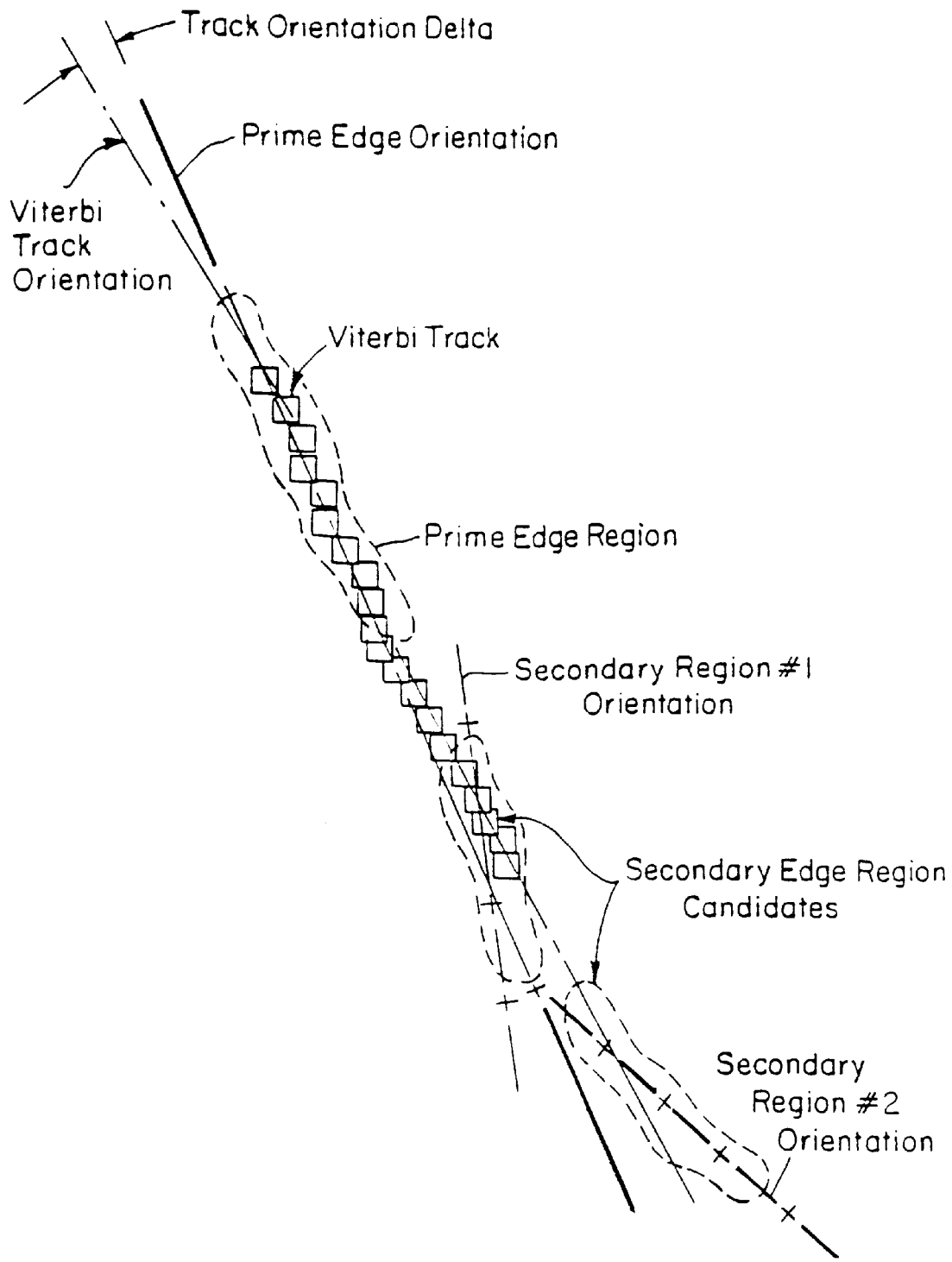
FIG. 15C illustrates a comparison of primary edge orientation with that of the Viterbi track and that of secondary regions.
Figure 15D:
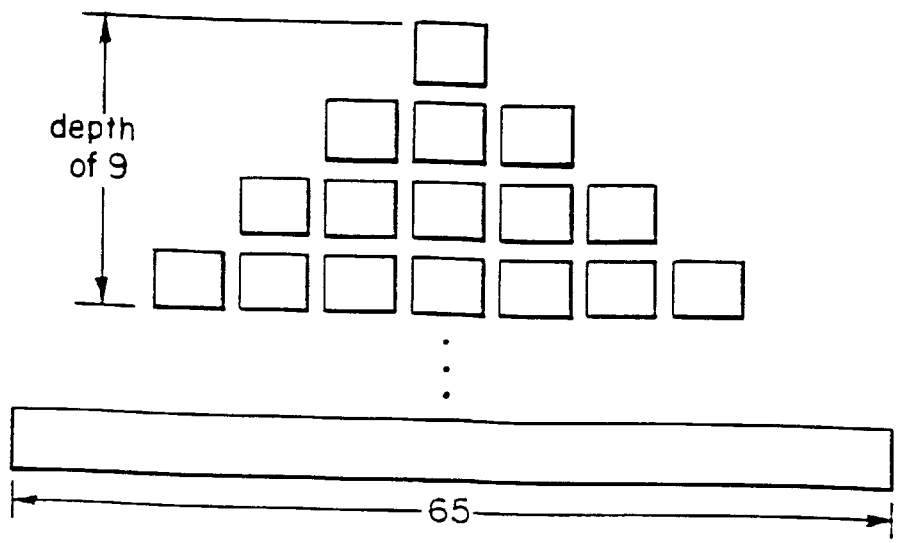
Figure 16:
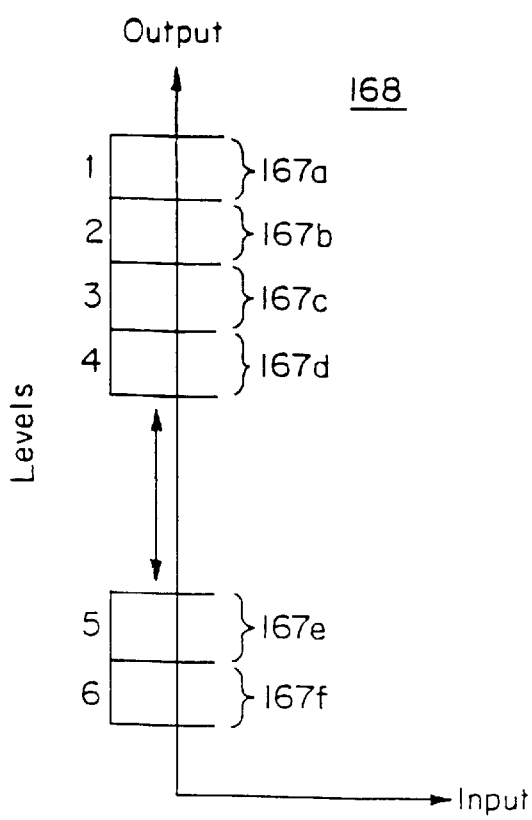
Figure 17:
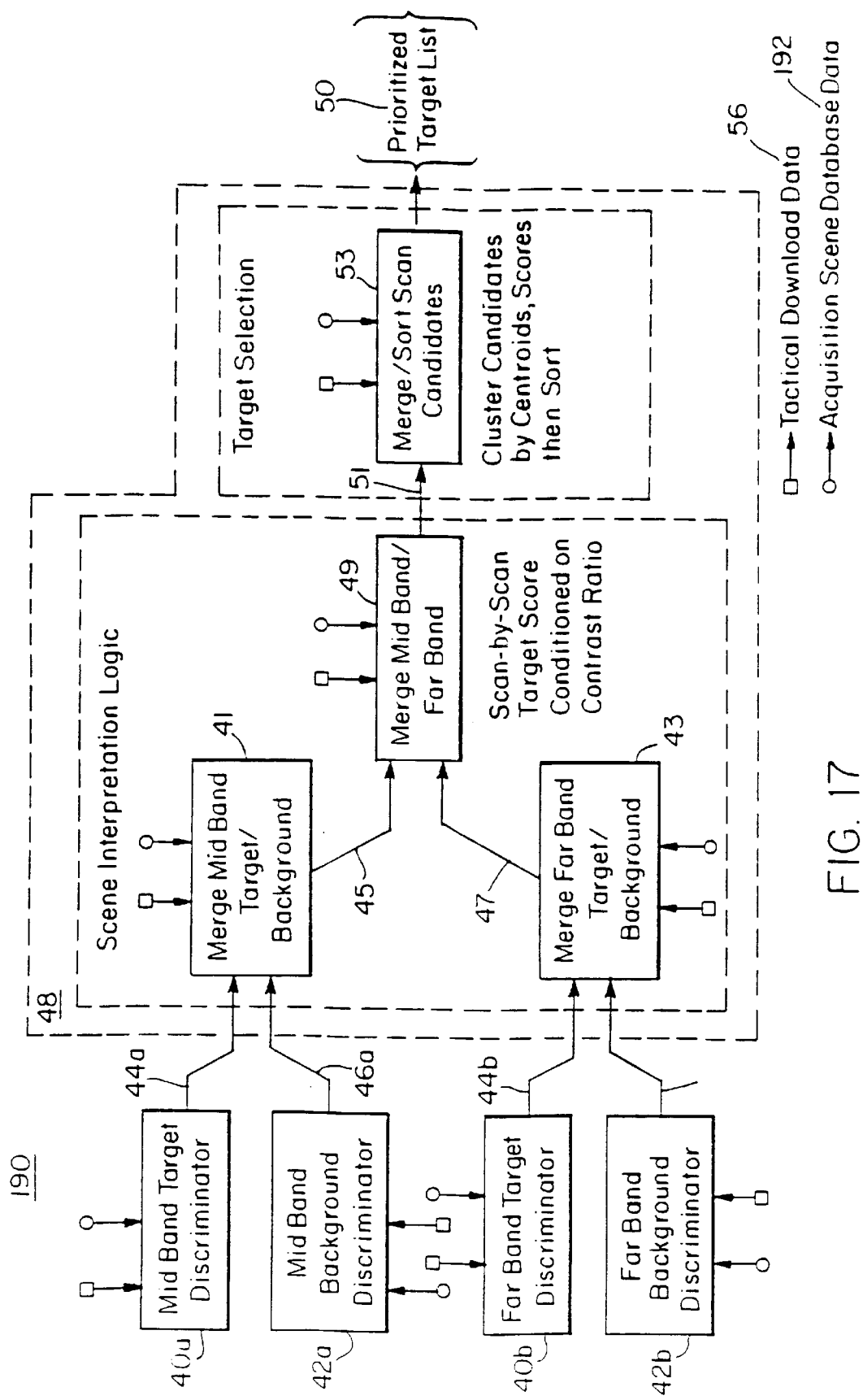
Figure 17A:
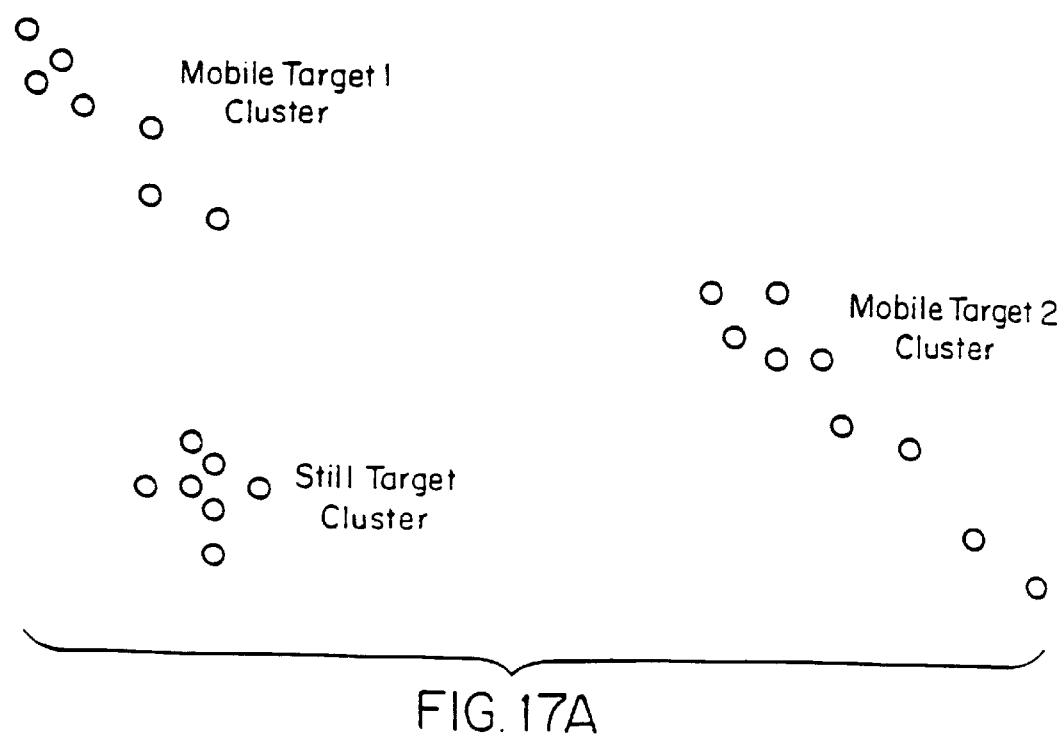

FIG. 15D Viterbi path metric data structure;

FIG. 16 is a graphical representation showing how background data is mapped to a pixel array used by the background discriminator of an imaging target detection system of FIG. 2;

FIG. 17 is a block diagram of image analysis logic used in the imaging target detection system of FIG. 2; and FIG. 17A illustrates scene database target candidate clusters.

Figure 1:
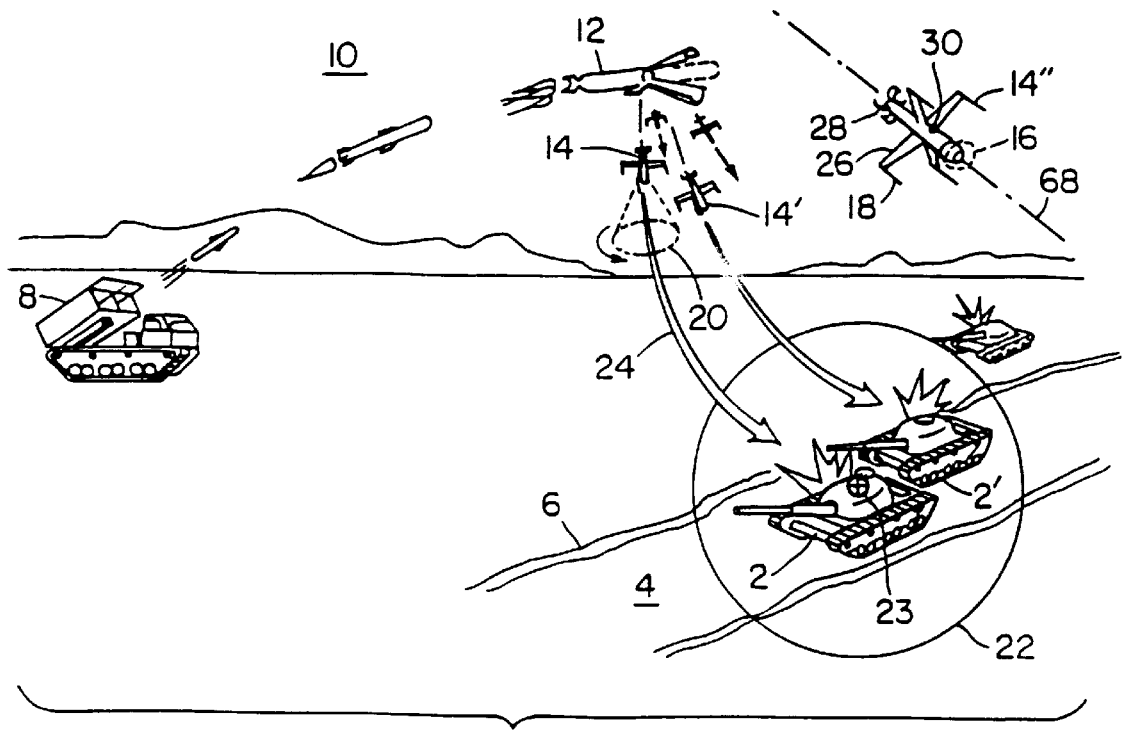
FIG. 1 is a perspective view showing the operation of a self-targeting missile on a target such as a tank.

There is shown in FIG. 1 a perspective view 10 of self-targeting missile operations showing a series of military targets 2 and 2', such as tanks, traveling along road 4 having road edge 6. Launcher 8 deploys missile 12 which contains a number of infrared (IR) submunitions 14, 14" and 14' which are free-falling aerodynamically steered vehicles. Each submunition illustrated by 14" is self-targeting and has an infrared sensor 16 for finding a target 2. In operation, submunition 14 is dropped from missile 12 and begins to seek out target 2 by performing a conical scan 20, centered around vehicle axis 68 which is pointed in the direction of center 23 of target area 22. Since communication with submunitions 14 is discontinued as soon as it is launched, the process of seeking out target 2 must be as accurate as possible. During conical scan 20, infrared sensor 16 detects formatted image 36, which is a series of image snapshots of target area 22, in two different infrared wavelengths (mid band and far band) or colors in order avoid targeting countermeasures and in response, submunition 14 adjusts its flight path 24 in the direction of target 2. The reason multiple snapshots are needed to be taken and evaluated is to allow target detection over a large area than can be viewed in a single conical scan projection. Flexible wings 26 and stabilizing fins 28 of submunition 14 enable it to continue on flight path 24. Upon impact with target 2, warhead 30 of submunition 14 explodes, destroying target 2.

Imaging target detector system 32, FIG. 2, resides inside submunition 14 and includes scanner 34 which produces formatted images 36 of target area 22, based on conical scan input 20. Each formatted image 36 is processed by target recognizer 38 which comprises target discriminator 40 and background discriminator 42. Target discriminator 40 determines target candidates 44 based on formatted image 36. Background discriminator 42 determines terrain characteristics 46 based on formatted image 36. Target candidates 44 and terrain characteristics 46 are further processed by scene interpretation logic 48 to produce list of prioritized targets 50. The highest priority target on the list is most likely to be destroyed by submunition 14. An important feature of this invention is that target and background data are processed separately. This allows for the use of smaller training data sets for each of the discriminators because training data specific to the target may be separated from the training data set for identifying background terrain characteristics. Prior art target detection systems process the target and background data together, requiring larger training data sets. Prior art systems need to store a separate image for each variation of target/terrain combination. For the same kind of target, for example a specific model tank, multiple image data sets need to be saved for every kind of terrain and weather expected to be encountered. If another type of target is later chosen, data sets for each of those weather and terrain conditions need to reproduced for the new target. This is not necessary for the imaging target detection system of this invention. Any specific target data set may be combined with any given terrain data to produce a combined target/terrain data set. The advantage to this arrangement is that target and terrain data may be collected and stored separately, making it easier and less expensive to build a complete training data set.

An embodiment of imaging target detector system 32a, FIG. 3, resides inside submunition 14 and includes scanner 34a, seeker image formatter 52, target recognizer 38a, and missile guidance and control logic 48a. Seeker image formatter 52 may be included in scanner 34a or may not be needed at all, depending on the type of scanner and the format of the image output that the scanner provides. If scanner 34a produces an unformatted image 35a which is not readable to target recognizer 38a then seeker image formatter 52 is required to produce formatted image 36a. For example, scanner 34a may be a mechanical infrared optics system containing a triple, concentrically mounted circular mirror system which produces a geometrically distorted image due to its rotary scanning mechanism. The output of such a scanner must be remapped to remove the distortion before target recognizer 38a can act on it to produce target candidates and background characteristics. Scanner 34a is initialized with prescribed search pattern 54, which includes data relating to types of targets that submunition 14 will seek, such as tanks. Target recognizer 38a is initialized with tactical download data 56, which is information specific to a given tactical situation, including the type of weather and terrain expected. For example, if it is known that the weather is likely to be clear, tactical data 56 may include an indication that more emphasis should be placed on the mid band data. Similarly, if the weather is expected to foggy in the target area, then more emphasis is placed on the far band data.

An embodiment of imaging target detector system 32b, FIG. 4, may be implemented in software by programming microprocessor 58, such as a TMS-320C40, to perform the functions of seeker image formatter 52b, target discriminator 40b, background discriminator 42b, and image analysis logic 48b, producing prioritized target list 50b in response to unformatted image 35b. Scanner 34b is an infrared seeker/scanner which contains rotating optics and detectors 60 which in response to conical scan input 20b produces an analog signal 62 which is processed by A/D converter 64 producing a digitized (comprised of pixels which represent amplitude levels) image output which contains information about scanned target area 22. The rotary optics of scanner 34b produces a distorted output which is remapped from a 14×256 pixel raw image in polar coordinates to a 128×128 pixel image.

Alternately, the rotary optics method of producing the M×M pixel image may be replaced by a steering focal plane array. In this alternate embodiment, the infrared energy remains focused on the planar array. At a periodic rate the X and Y addresses of each of the M×M, here 128×128, pixel elements are strobed and an analog signal proportional to the infrared energy incident on the pixel located at site location X,Y is read out to an analog to digital conversion so that a digital pixel array representing the image is produced and stored in memory.

Figure 5:
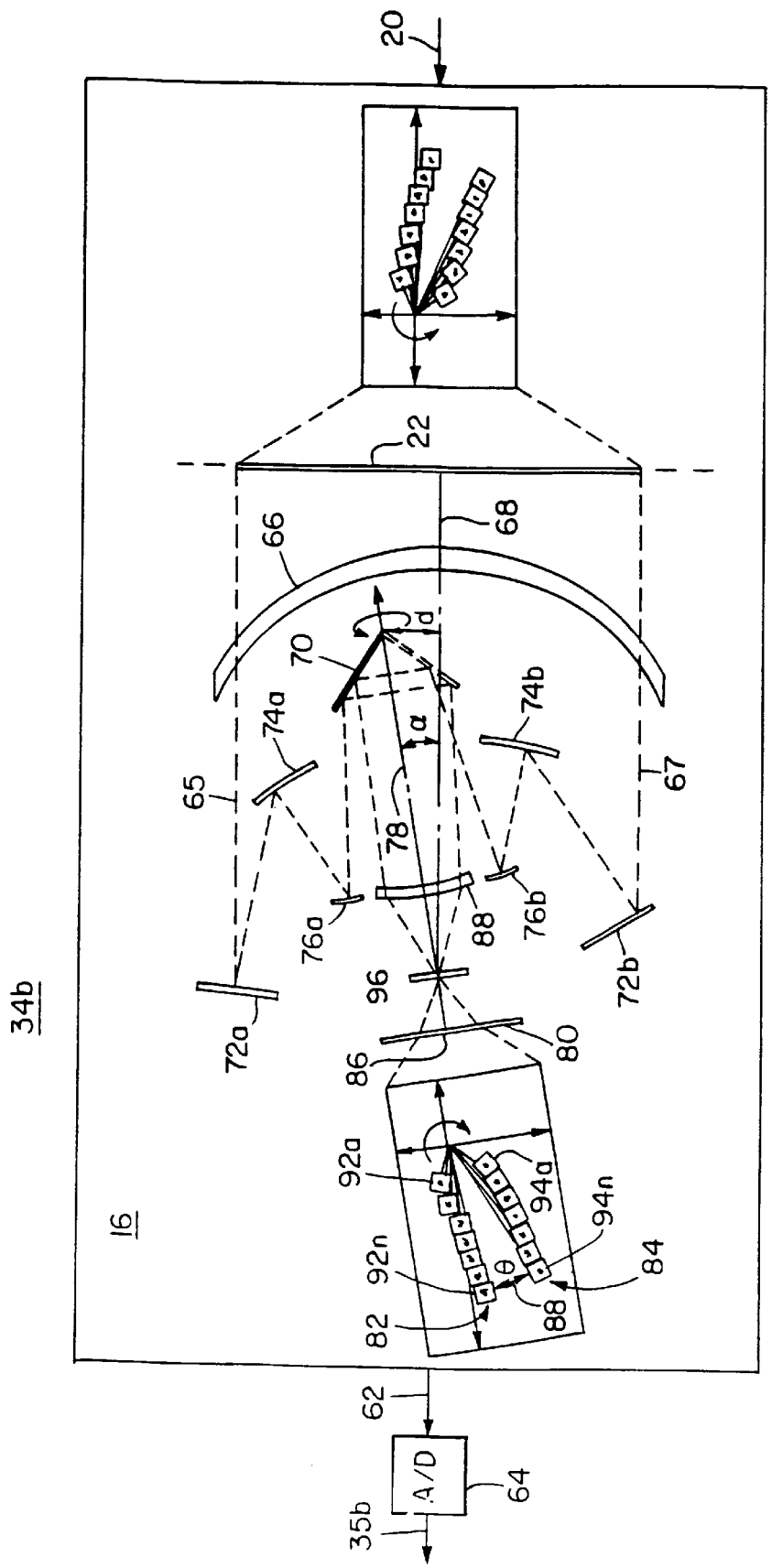
FIG. 5 is a cross-sectional representation of an infrared seeker/scanner used in the imaging target detection system of FIG. 2.

A cross-sectional side view of infrared seeker/scanner 34*b*, FIG. 5, located within submunition 14 has seeker dome 66 which accepts infrared energy from target 2 and is centered around vehicle axis 68 of submunition 14. Scanner 34*b* is a mechanical infrared optical scanning mechanism having a triple, concentrically mounted, circular mirror system which comprises rotating roof mirror 70, primary mirrors 72*a* and 72*b*, secondary mirrors 74*a* and 74*b*, tertiary mirror 76*a* and 76*b*. Rotating roof mirror 70 rotates about gimbal axis 78. Primary mirrors 72*a,b*, secondary mirrors 74*a,b* and tertiary mirrors 76*a,b* are concentrically mounted around gimbal axis 78 and rotate along with rotating roof mirror 70 while remaining at a fixed position away from each other and from gimbal axis 78. Gimbal axis 78 rotates about vehicle axis 68 when it performs conical scan 20 of object plane or target area 22.

In operation, infrared energy from target area 22, representative of target and background terrain characteristics, enters seeker dome 66 and is detected by two different sensor line, or linear, arrays 82 and 84. Linear arrays 82 and 84 each contain 14 elements which are uniformly spaced apart and extend in a radial direction on focal plane 80. (Note: only seven elements are shown in the linear arrays of FIG. 5 but in a preferred embodiment, there are 14 elements in each linear array). Linear arrays 82 and 84 are separated by angle θ 88, which in a preferred embodiment is 56.25°. Each linear array represents a different color or wavelength, for example, linear array 82 detects infrared energy in a mid band and layer array 84 detects infrared energy in the far band. The reason for detecting infrared energy in two separate colors or infrared wavelength bands is to avoid targeting countermeasures. Since countermeasures generally have a different spectral signal than the target, it is possible to separate the target from the countermeasure by collecting seeker data at two different wavelengths.

Detector 86 of detector plane 80 (also known as the focal plane) is attached perpendicularly to gimbal access 78, and rotates with rotating roof mirror 70. Mid band infrared energy from conical scan 20 of target area 22 enters seeker dome 66 on path 65, and is reflected off primary mirror 72*a* toward secondary mirror 74*a* which reflects its energy onto tertiary mirror 76*a*. Tertiary mirror 76*a* reflects the mid band infrared energy onto one side of rotating roof mirror 70, and is reflected across to the opposite side of rotating roof mirror 70. The opposite side of rotating roof mirror 70 reflects energy through lens 88 and onto detector plane 80 where it is detected by linear arrays 82 and 84. Infrared energy is picked up in the mid band by each of the 14 elements 92*a–n* of mid band array 82, and in the far band by detector elements 94*a–n* in far band detector array 84. The resulting analog signal 62 contains information in mid band 82 and far band 84 and is then converted to a digital signal by analog to digital converter 64 to produce unformatted areal image 35*b* which needs to be formatted before target recognizer 38 will be able to analyze it.

Figure 6:
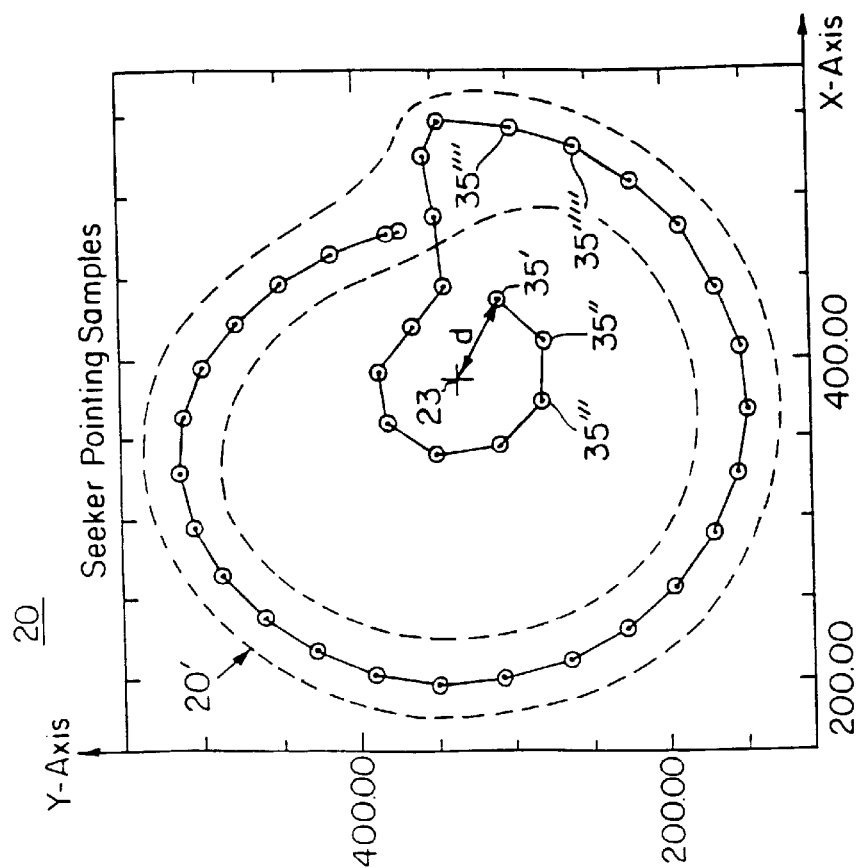
FIG. 6 is a perspective view of a conical scan pattern of the infrared seeker/scanner of FIG. 5.

Conical scan 20, FIG. 6, shows how successive offsets d of gimbal access 78 can be used to survey an entire target area 22. A series of snapshots such as 35', 35" and 35'" are taken by scanner 34 as gimbal axis 78 rotates about vehicle axis 68 at successively larger distances d away, while performing conical scan 20 of target area 22. Information from each of these snapshots is analyzed to determine the likelihood of the existence of a target. Unformatted areal image snapshot 35' is taken simultaneously at the mid band and far band wavelengths.

Figure 7B:
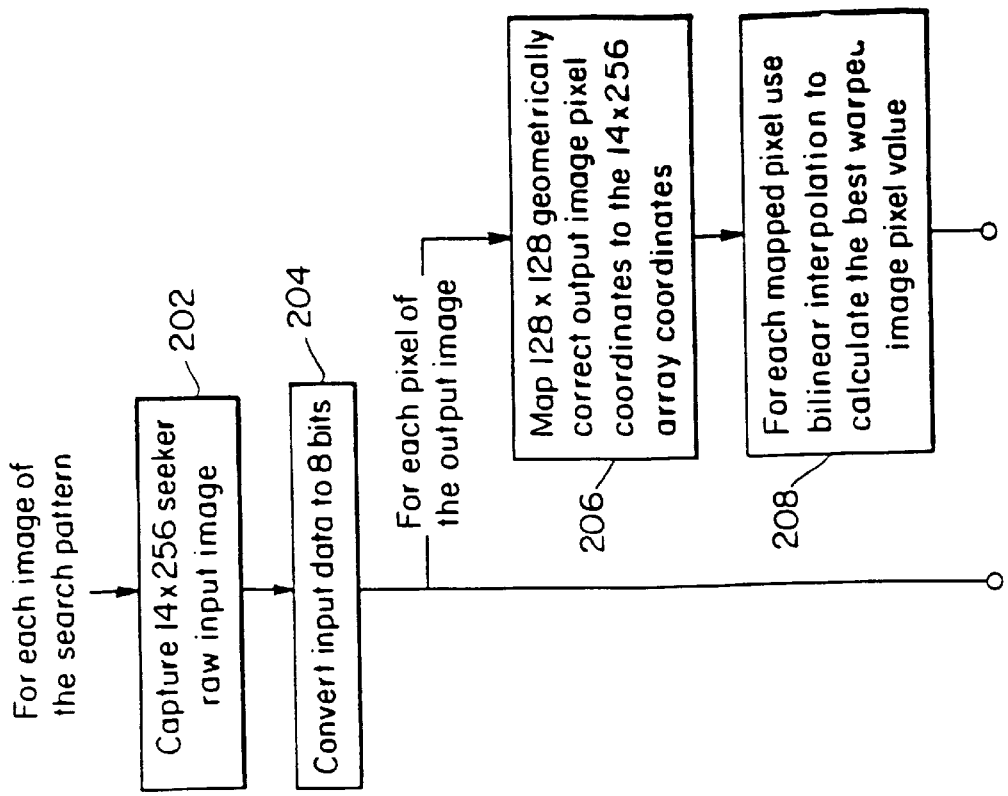
FIG. 7B is a flow chart of logic used to program the microprocessor in the scanner of the imaging target detection system of FIG. 2.
Figure 7A:
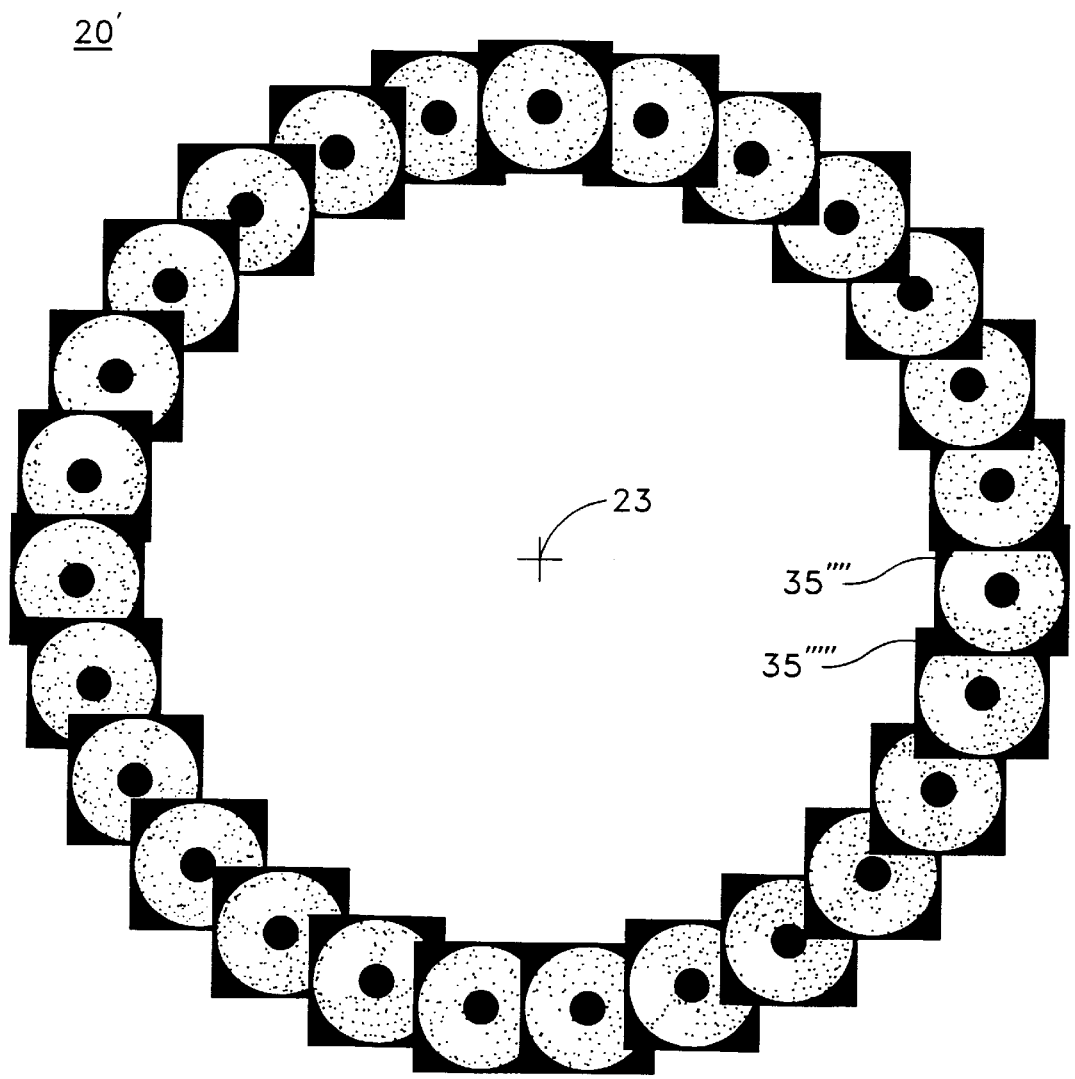
FIG. 7A is a perspective view showing a series of areal image snapshots taken during the conical scan of FIG. 6.

Outer ring 20', FIG. 7A, of conical scan 20 shows unformatted areal image snapshots 35"" and 35"'" taken from outer edge of target area 22 having center 23. Due to the rotary scanning mechanism, pixels on outer radius 96 of detector plane 80 are sampled at larger spatial intervals resulting in a non-uniform geometric scale factor between viewed target area 22 and unformatted image snapshot 35'. Unformatted image snapshot 35' appears distorted, making target and background characteristics more difficult to identify. For example, road edges appear as curves as opposed to straight lines. Seeker image formatter 52 accepts unformatted image snapshot 35', remove the distortion, and produce formatted image snapshot 36' which more clearly exhibits the target and background characteristics of target area 22. Seeker image formatter 52 may be implemented in software which runs on a microprocessor 58, such as TMS-320C40. An example of said software is shown in FIG. 7B where unformatted image snapshot 35' is captured as input, step 202, converted to 8 bits, step 204, and mapped to a geometrically correct pixel image, step 206. A warped image pixel value is calculated using bilinear interpolation on each mapped pixel, step 208.

Figure 8:
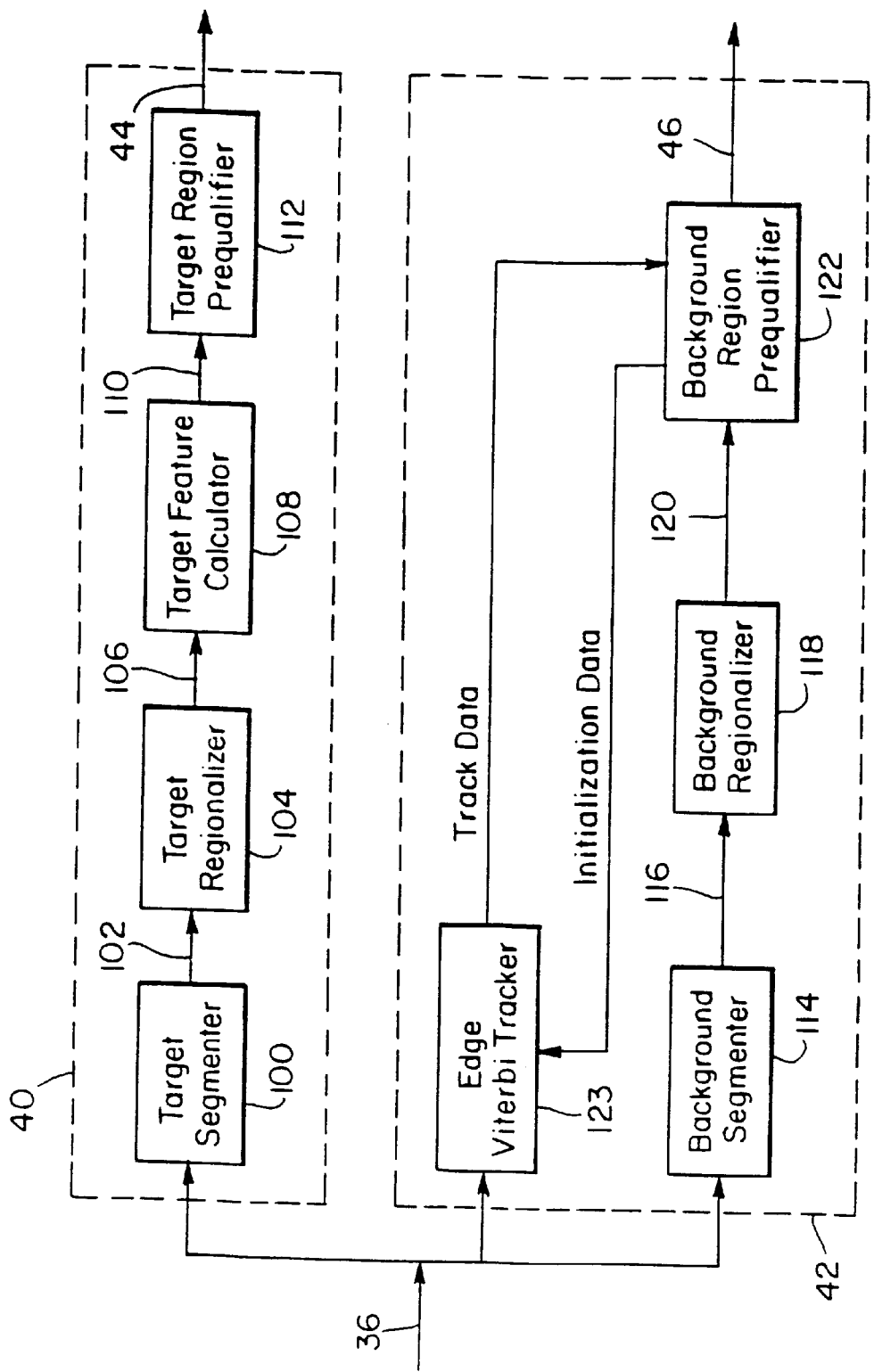
FIG. 8 is a more detailed block diagram of the target recognizer of the imaging target detection system of FIG. 2.

Image 36 is input one snapshot at a time into target recognizer 38, FIG. 8, which comprises target discriminator 40 and background discriminator 42 which process each of the snapshots contained in the formatted image 36 separately to produce a set of target data 44 and a set of background data 46.

Target discriminator 40 is applied in parallel to both the far band and mid band infrared image data. Target discriminator 40 includes a target segmenter 100 which identifies image pixels of similar intensity (amplitude) levels contained in formatted image 36 and maps them into one of ten discrete levels, producing segmented target data 102.

Each pixel of segmented target data 102 is then processed by target regionalizer 104 in order to group contiguous pixels of similar intensity (amplitude) levels into labeled regions, producing regionalized target data 106. After each region has been labeled with a unique index, the regionalized data 106 is subjected to a feature analysis performed by a target feature calculator 108. Target feature calculator 108 determines whether or not a region is consistent with target dimensions based on the area of each region. If the area is above or below certain area thresholds then the region is inconsistent with target dimensions and no more feature calculation for that region is performed. (That region is not placed on the target candidates list and assumed not to contain useful information for determining where a target lies.) Other target discrimination features calculated include shape features, relative signal intensity features, and relative position features. Once the inconsistent regions have been filtered out, remaining regions 110 are processed by target region prequalifier 112 which produces a target candidate list 44.

Background discriminator 42 is applied in parallel to both the far band and mid band infrared image data. Background discriminator 42 includes a background segmenter 114 which assigns a class level to each image pixel, contained in image 36 producing segmented background data 116.

Each pixel of segmented background data 116 is then processed by background regionalizer 118 in order to group contiguous pixels of the same class label into indexed regions, producing regionalized background data 120. After each region has been labeled with a unique index, the regionalized background data 120 is subjected to a region analysis performed by a background region prequalifier 122 which includes region feature calculation as required. Background region prequalifier 122 determines whether or not a region is consistent with a set of rules developed to express the observed characteristics of imaged road edges. If there exists within a scan image a set of regions which possess individual area and shape features and collectively possess relative orientations which are consistent with an imaged road edge, then a road edge is declared to exist within the scan image. Initialization data is then passed to Viterbi edge tracker 123 and the original seeker pixel data is subjected to a maximum likelihood track feature analysis. This analysis produces information used to adjust the road edge detection score, calculated in the background region prequalifier 122 to produce the road edge background data of 46.

Figure 9:
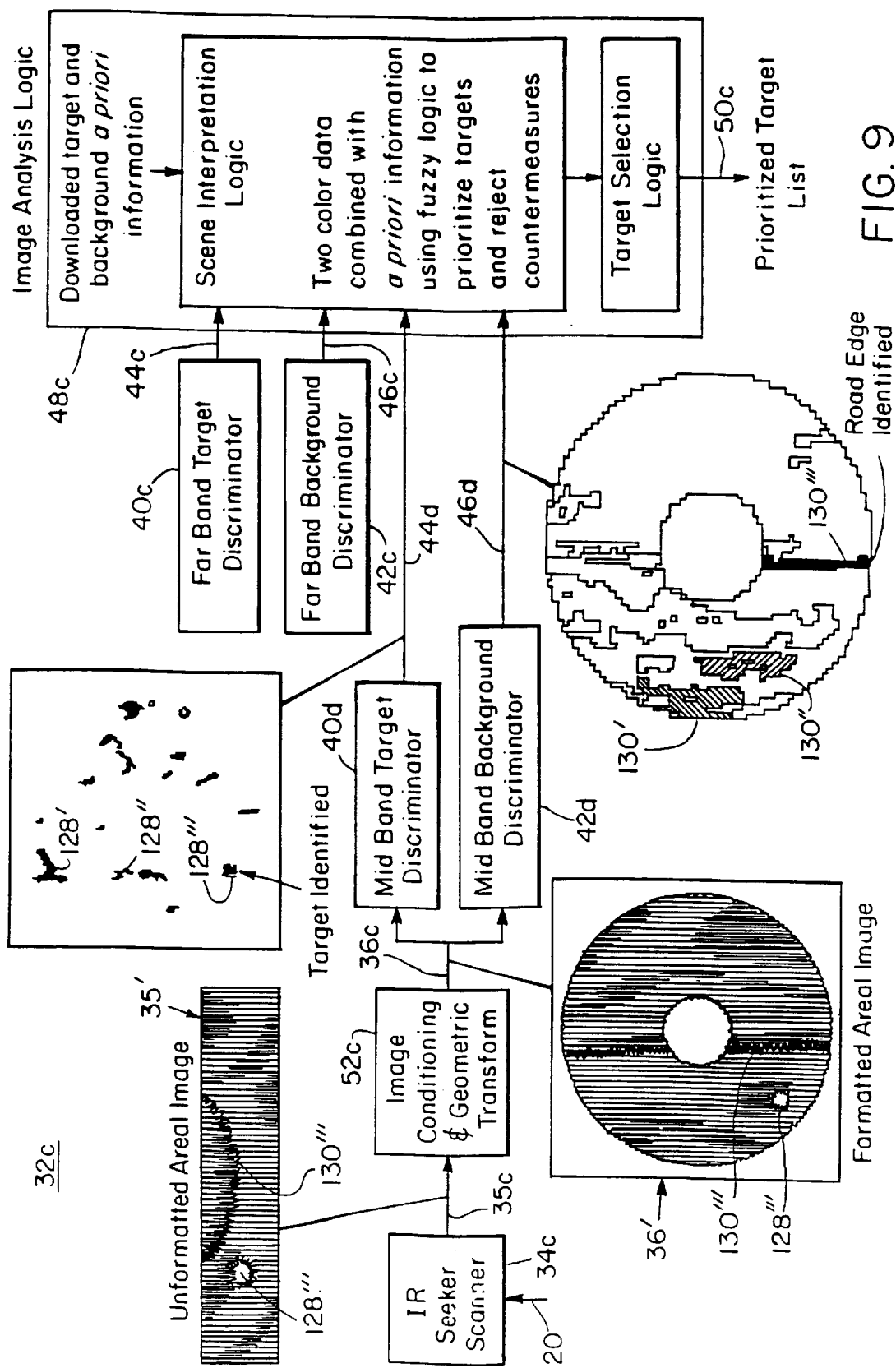
FIG. 9 is a more detailed block diagram of the imaging target detection system of FIG. 2 showing the mid band target and background discriminators.
Figure 10:
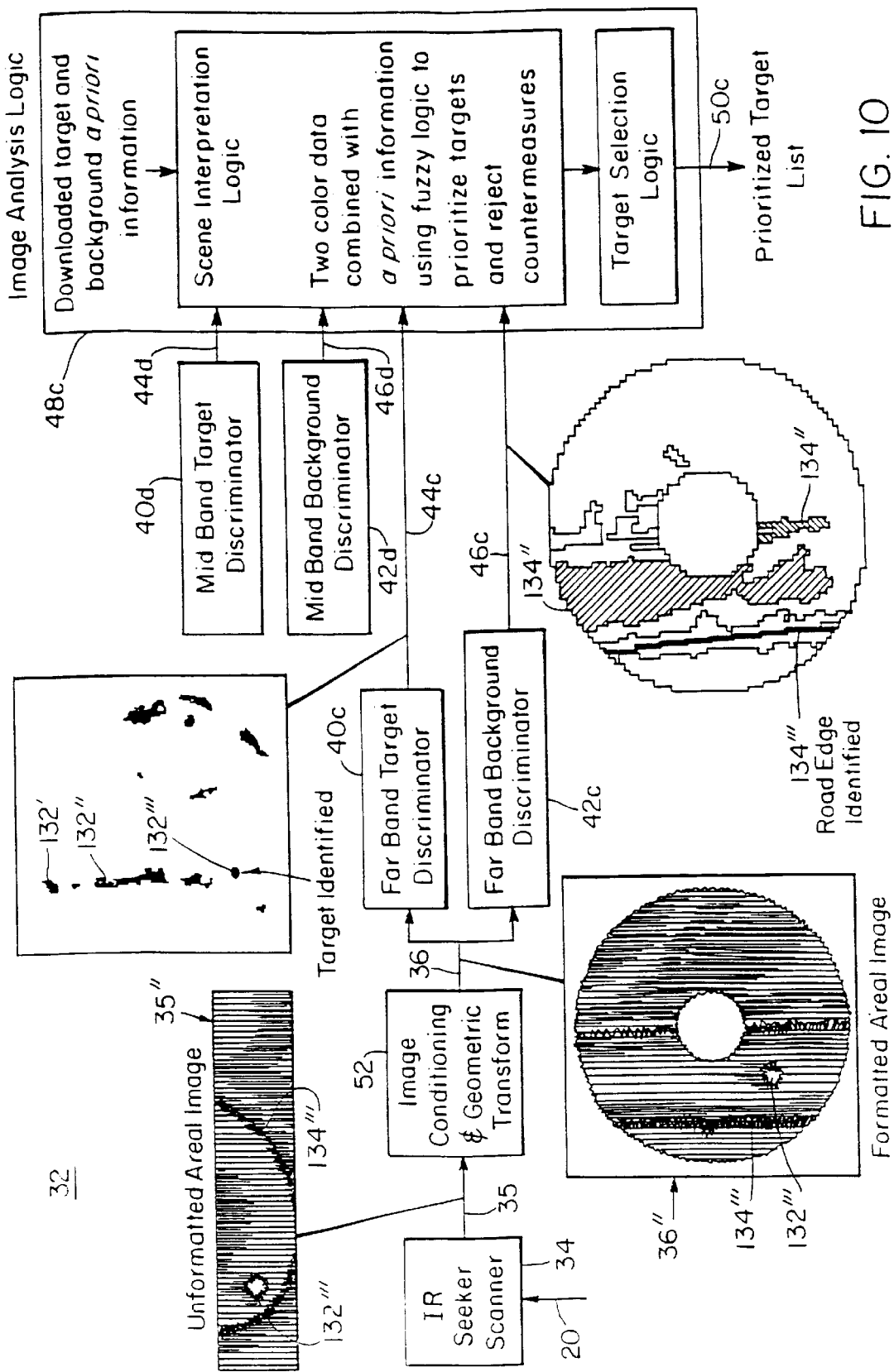
FIG. 10 is a view similar to FIG. 9 showing the far band target and background discriminators.

Imaging target detection system 32c, FIG. 9, shows how formatted image 36c is processed in the mid band wavelength or color. Only the operation of the mid band target and background discriminator is shown. Operation of the far band discriminators is shown in FIG. 10. Conical scan input 20 taken from submunition 14 is detected by scanner 34 producing an unformatted image 35, which comprises a series of snapshot images 35', 35", 35'", etc. One such snapshot 35' is depicted as a raw image showing target 128'" and road edge 130'". Note that road edge 130'" is depicted as a curved line due to the distortion of the image from the rotary scanning mechanism of scanner 34. This image data is processed by seeker image formatter 52 which performs image conditioning and a geometric transform on snapshot data 35' to produce image snapshot 36' showing target 2 and road edge 6. Note that road edge 6 is now a straight line in the formatted image snapshot. Image snapshot 36' is processed by mid band target discriminator 40d, mid band background discriminator 42d, far band target discriminator 40c and far band background discriminator 42c. Mid band target discriminator 40d produces a set of target candidates 44d, pictorially represented by mid band target regions 128', 128", and 128'". Note that actual target 2 is included among the target candidates 44d and is shown as mid band target region 128'". Target candidates are determined for each image snapshot 36', 36", etc. contained in formatted areal image 36 and provide input to image analysis logic 48c. Note that target candidate 128'" corresponds to actual target 2.

Mid-band background discriminator 42d responds to each snapshot image 36', 36", etc. contained within formatted image 36 to provide a number of background terrain characteristics 46d as depicted by selected background regions 130', 130", and 130'". Selected mid band background region 130'" corresponds to an identified road edge. Background terrain characteristics 46d for each of image snapshots 36', 36", etc. contained within image 36 are further processed by image analysis logic 48c. Additional inputs to image analysis logic 48c are far-band target candidates 44c and far band background terrain characteristics 46c. Image analysis logic 48c processes target candidates 44c,d and terrain characteristics 46c,d producing prioritized target list 50c.

Imaging target detection system 32, FIG. 10, shows how image 36 is processed in the far band wavelength or color. Only the operation of the far band target and background discriminators is shown. Operation of the mid band discriminators are shown in FIG. 9. Conical scan input 20 taken from submunition 14 is generated by scanner 34 producing an unformatted image 35, which comprises a series of snapshot images 35', 35", 35'", etc. One such snapshot 35' is depicted as a raw image showing target 132'" and road edge 134'". Note that road edge 134'" is depicted as a curved line due to the distortion of the image from the rotary scanning mechanism of scanner 34. This image data is processed by seeker image formatter 52 which performs image conditioning and a geometric transform on snapshot data 35' to produce formatted image snapshot 36' showing target 132'" and road edge 134'". Note that road edge 134'" is now a straight line in the formatted image snapshot. Image snapshot 36' is processed by far band target discriminator 40c, far band background discriminator 42c, mid band target discriminator 40d and mid band background discriminator 42d. Far band target discriminator 40c produces a set of target candidates 44c, pictorially represented by selected far band target regions 132', 132", and 132'". Note that the actual target is included among the targets 44c and is shown as far band target region 132'". Target candidates are determined for each formatted image snapshot 36', 36", etc. contained in image 36 and provide input to image analysis logic 48c.

Far band background discriminator 42c responds to each snapshot of formatted image 36', 36", etc. contained within formatted image 36 to provide a number of background terrain characteristics 46c as depicted by selected far band background regions 134', 134", and 134'". Selected far band background region 134'" corresponds to an identified road edge. Background terrain characteristics 46c for each of formatted image snapshots 36', 36", etc. contained within formatted image 36 are further processed by image analysis logic 48c. Additional inputs to image analysis logic 48c are mid band target candidates 44d and mid band background terrain characteristics 46d. Image analysis logic 48c processes target candidates 44c,d and terrain characteristics 46c,d producing prioritized target list 50c.

Figure 11:
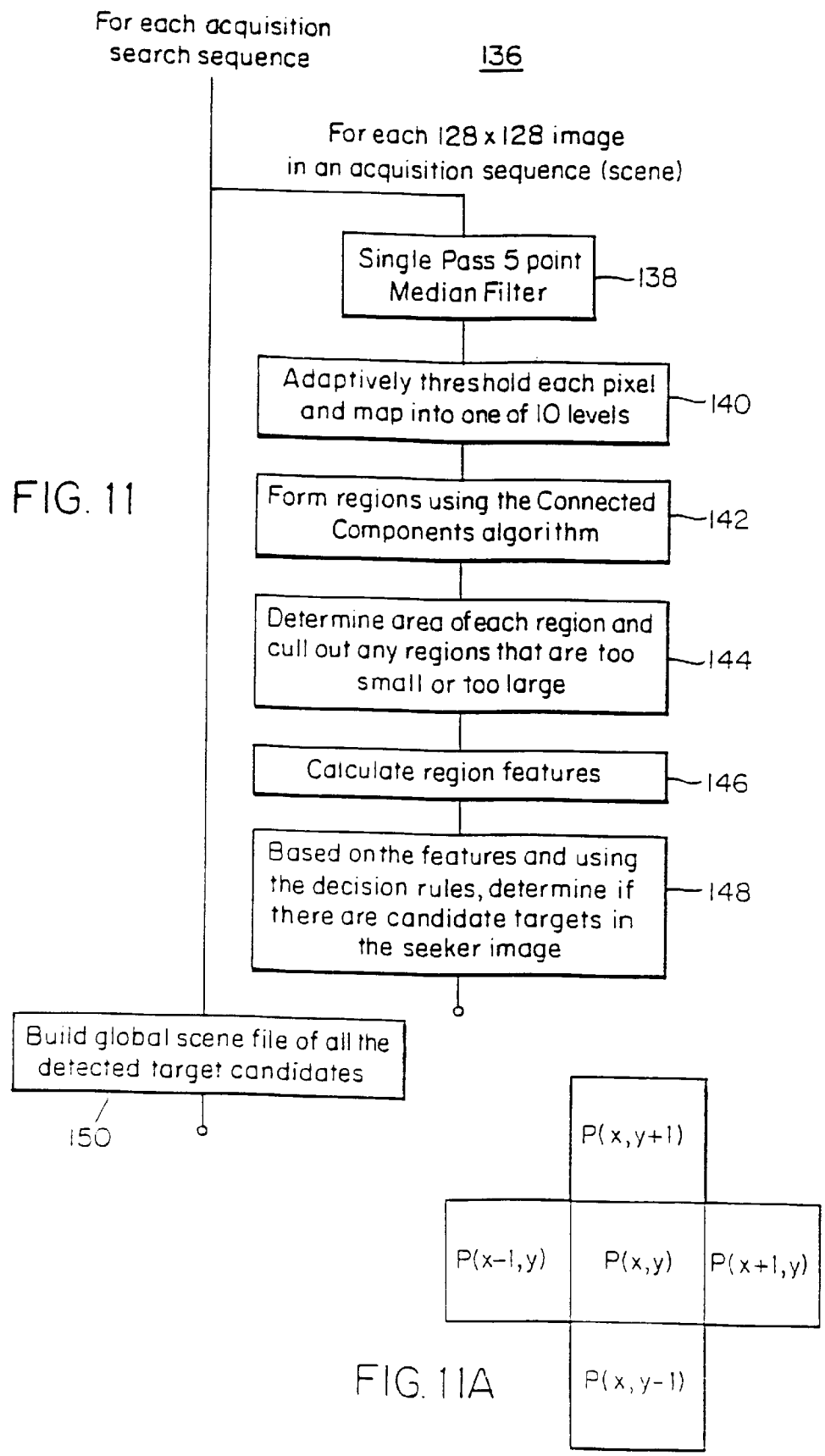
FIG. 11 is a flow chart of logic used to program the microprocessor in the target discriminator of the imaging target detection system of FIG. 2.

Target discriminators 40c and 40d operate as shown in flow chart 136, FIG. 11. Each pixel contained in formatted image snapshot 36', 36", 36'", etc. in an acquisition search sequence (formatted areal image) 36, is filtered with a single pass five point median filter to reduce speckle noise, step 138. The five point median filter determines a new value for each pixel or position in the image frame (except the edges) from the five pixels or positions that form a cross centered on the pixel of interest as shown in FIG. 11A. The median value of the five pixels is determined; this determines the new value of the pixel of interest (i,j). This is done for every pixel or position in the image frame except the edge pixels which are unmodified. The new pixel values calculated are stored in another memory buffer and do not replace the original values.

Each pixel of the filtered image is then (adaptively) thresholded by a non-linear mapping determined by the image grey level cumulative distribution function and mapped into one of a number of levels based on the amplitude of that pixel's infrared intensity, step 140. One embodiment of the invention accomplishes this using ten amplitude levels. The connected components algorithm is used to compare each thresholded pixel to its adjacent pixel on a raster scan basis in order to form regions, step 142. The area of each region is determined and any regions which are too small or too large based on a set of region criteria are culled out, step 144. Region features are then calculated based on the remaining regions, step 146. Based on decision rules and region features, the existence of target candidates in the seeker image is determined, step 148. By performing steps 138, 140, 142, 144, 146 and 148 for each image snapshot in the acquisition sequence, a global scene file of all detected target candidates is built, step 150, corresponding to the entire acquisition search sequence, or image 36.

Figure 13:
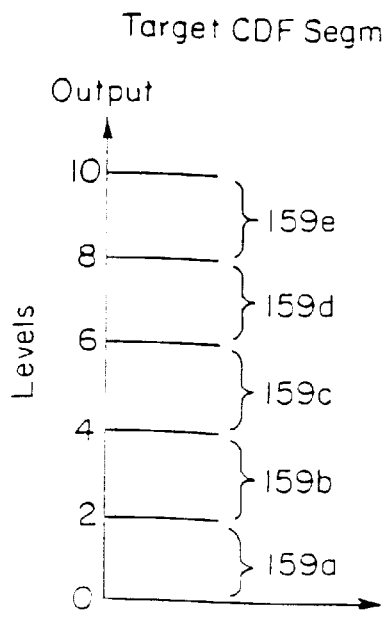
FIG. 13 is a graphical representation showing how the target data is mapped into pixels having ten discrete levels, based on the amplitude of the target signal.
Figure 13A:
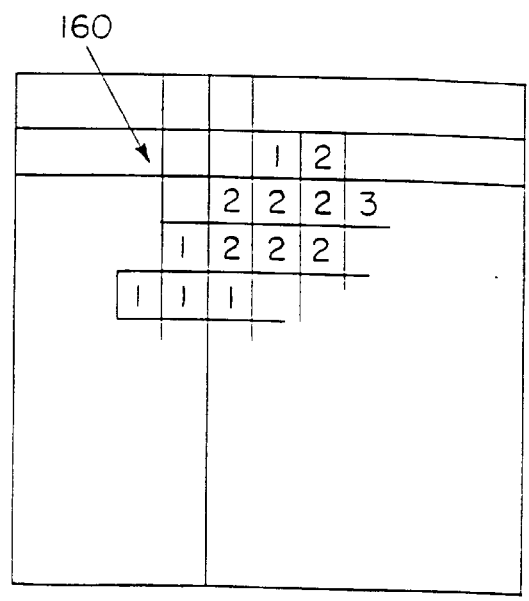
FIG. 13A is a pixel array containing the requantized pixel intensity values.

Target input data graph 157, FIG. 13, shows the discrete levels into which input data levels 159a, 159b, 159c, 159d and 159e are adaptively thresholded and mapped by target discriminator 40, step 140, in order to produce a pixel array 160, FIG. 13A, which is then processed using the connected components algorithm. FIG. 13B indicates the process of adaptive requantization which is used to segment the filtered image pixels into one of ten amplitude levels. A cumulative distribution function (COF) of the image pixel intensities is formed as shown in FIG. 13B. A vector of percentiles, established during recognizer training, is used to establish the pixel thresholds for requantization. There are nine thresholds used to establish the ten output levels. Each threshold is the value of pixel intensity which corresponds to one of the CDF percentiles. It can be seen, therefore, that the threshold values adaptively change from scan image to scan image in response to changes in the pixel intensity distribution. The image is then thresholded such that if the threshold(k-1) is less than or equal to image.level(i,j) and image.level(i,j) is less than or equal to threshold(k), then image.level(i,j) set equal to (k).

Figure 12:
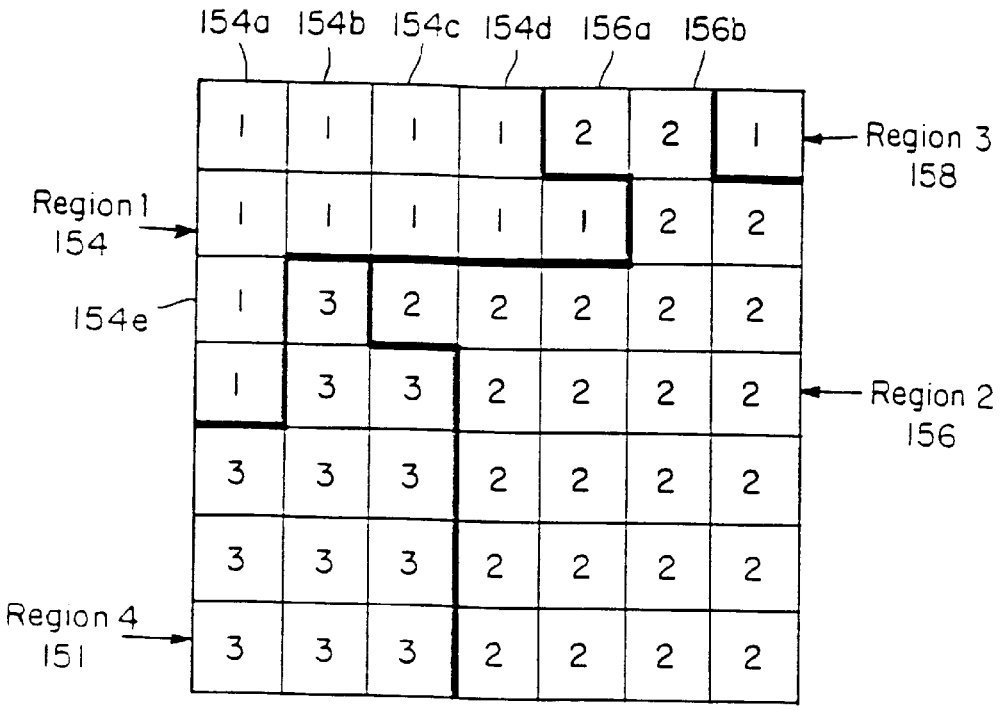
FIG. 12 is a 7×7 pixel array illustrating operation of the connected components algorithm used in the imaging target detection system of FIG. 2.

Pixel array 152, FIG. 12, is a 7×7 array of pixels illustrating the operation of the connected components algorithm which is used to regionalize pixels in both target discriminator 40 and background discriminator 42. Each pixel is compared to adjacent pixels in a raster scan of the rows of the entire pixel array. A first pixel 154a is compared to adjacent pixel 154b. If their values are the same, then both pixels are classified as being in the same region. If their values are not the same, then a new region is created. Since the pixel 154a and pixel 154b both have the same value (one), these pixels are put into a first region 154. In contrast, when pixel 156a, which has a value of two is processed, a new region 156 is created starting with pixel 156a because its value is different from adjacent pixel 154d which has a value of one. This processing continues until all of the pixels in the array have been placed into regions. Pixel array 152 has been divided into four regions: region one 154, region two 156, region three 158 and region four 151.

The difference between the pixel array processed by the target discriminator and the pixel array processed by the background discriminator is in what each pixel value represents. The pixel array processed by the target discriminator comprises values corresponding to one of ten discrete levels of the input signal amplitude. The pixel array processed by the background discriminator comprises values corresponding to class index values where the number of class index values is variable and depends on the image being processed.

Area determination 144, FIG. 11, consists of counting the number of pixels which comprise each of the regions previously established by the connected components algorithm.

Region feature calculation 146, FIG. 11, comprises the calculation of seven numerical features for each of the regions with associated region area value greater than a minimal predetermined threshold. The first of these features is the global signal to noise ratio for region k, snrglobal[k], which is calculated as $$\text{snrglobal}[k] = 10 * \log 10((\text{greylevels.mean}[k])/\text{imagestatsfiltered.greylevel.mean}),$$
where imagestatsfiltered.greylevel.mean is the mean pixel level of the median filtered image and greylevels.mean[k] is the mean pixel intensity level of region k.

The remaining features are the local signal to noise ratio, snrlocal[k], for every pixel in the local bounding rectangle, and not in the region k,
ncnt=ncnt+1, count the number of such pixels
sigrect=sigrect+gimagefiltered(i,j) add the pixel signal level to the
accumulated pixel signal level.
if ncnt .ne.0,
   snr.local[k] = 10log10(greylevels.mean[k]/(sigrect/ncnt))
else
   snr.local[k] = 10log10(greylevels.mean[k]/imagestatsfiltered.graylevelmean)

Note:
the local background is a 17 x 17 pixel region around region k's centroid where boundaries reduce the area for regions where the local patch overlaps the edge of the viewing frame.

The region bounding rectangle signal to noise ratio, snrbddRect[k]

the calculation is the same as for snr.local[k] except the bounding rectangle
is calculated as
  imax=bddrect[k].imax+0.5*idiff
  imin=bddrect[k].imin−0.5*idiff
    where idiff=bddrect.imax−bddrect[k].imin and
  jmax=bddrect[k].jmax+0.5*jdiff
  jmin=bddrect[k].jmin−0.5*jdiff
    where jdiff=bddrect.jmax−bddrect[k].jmin,

```
                maxdiff=abs[grey]levels.max[k]-gImagestatsfiltered.greylevels.mean]
                maxdiff=abs[grey]levels.min[k]-gImageStatsFiltered . . . mean]
    if(maxdiff>>mindiff)
                snrpeak[k]=10log10(greylevelsmax[k]/gimagestatsfiltered.greylevels.[mean]
                snrclutter[k]=10log10(maxdiff/gimagesttatsfiltered.greylevels.mean)
        else
                snrpeak[k]=
                10log10(max[greylevels.min[k];1].gimagestatsfiltered.greylevels.mean]
                smrclutter[k]=1-log10(max[features[k].greylevels.min;1]/gimagestatsfiltered.greylevels.mean]
                        where max(a,b) indicates the maximum of a and b,
the region spread feature, spread[k],
                suminert[k]=ci**2+cj**2
                spread[kj =s.0*PI*suminert[k]/(area[k]**2)
and the normalized elliptical shape factor of region k, ESFnA [k]
                sa=0.5*area[k]
                fm20=ci2*suminert[k];
                fm02=cj2*suminert[k];
                fm11-cij*suminert[k];
                ss=fm20+fm02;
                sf=sqrt(((fm20-fm02*fm20-fm02))+4.0*fm11*fm11);
                semimn[k]=sqrt((ss-sf)/sa);/*radius*/
                semim[k]=sqrt((ss+sf)/sa);
                ellarea=π*semimn[k]*semimj[k];
                semiMinor[k]=2.0*semimn[k];
                semiMajor[k]=2.0*semim[k];
                apb=semimn[kk]+semimj[k];
                aqp-(semimj[k]-semimn)[k]/apb;
                aqb2=aqb*aqb2;
                aqb4=aqaqb2*aqb2;
                q64=640-3.0*sqb4;
                q64=q64/(64.0-16.0*aqb2)
                pp=π*apb*q64;
                p2=pp*pp
                p2ae=p2/ellarea;
                ellipseShapefactor[k]=p2a/p2ae;
                maxESF=0.0862*area[k];
                ESFnA[k]=(maxSF-ellipseShapefactor[k])/maxESF;
```

Target region selection logic 148, FIG. 11, consists of two region examination steps as shown in the flow chart 164, FIG. 14. The first pass examines the region features for all of those regions which pass an initial area test. If the features of each examined region, k, pass the series of threshold tests then each such region, k, is declared a target candidate region. The second region association and deselection step examines all pairs of target candidate regions and eliminates from the candidate list any regions which have a location centroid coordinates which reside within the bounding rectangle of a second candidate when the signal to noise ratio of the second candidate is greater than that of the first candidate. Those candidates which pass these qualification tests are entered into a global scene database.

Global scene database establishment 150, FIG. 11, merges data from target candidate objects which are viewed through several sequential overlapping frames. The location coordinates for the target candidates for each frame are shifted by the offset of the frame pointing vector and are (within the pointing error) translated to a scene coordinate frame so that the results of all of the multi-frame processing can be evaluated in an integrated and consistent fashion.

Background discriminator logic 166, FIG. 15 operates in parallel with target discriminator logic 136 and processes both mid and far band image data when both are available, accepts seeker image data 36 and first determines whether the image is valid based on the assumed clutter pattern, step 172. The image's pixel data mean and sigma are compared to limits derived from representative IR terrain imagery. This imagery is in the recognizer training data set. If the acceptable bounds for valid imagery are violated, then processing stops and an invalid image is declared. This process assures that the imagery analyzed for targets has the same statistical characteristics as the image data for which the recognizer was designed. If the image is valid, it is then processed in parallel using two methods: Viterbi feature tracking, step 174 and vector quantization (VQ) Segmentation, step 176. The purpose of both methods is to determine whether road edge candidates exist in the seeker image.

Viterbi feature tracking, step 174, tracks line features through the original image and determines the degree to which these line features represent a road edge. This type of tracker is useful where variations in the original infrared reflectivity disturbances and the road edge itself lead to a fragmented set of regions being formed by the vector quantization segmentation process. Also, the Viterbi tracker can perform when DC offsets between sensor channels create ridges between road region segments that otherwise might not be associated at the segmentation level. The features calculated form the Viterbi track are the track centroid and the track orientation.

Background input data graph 168, FIG. 16, shows how vector quantization (VQ) segmentation used to map areal image data to a set of class indices 167a–f, forming a pixel array of background data which is then processed by the connected components algorithm to produce regionalized background data 120. The number of class indices is variable and depends on the image being processed.

In the vector quantization segmentation process, step 176, the image is examined on a block basis to determine kinds of variation which indicate the likely presence of roads. The 256×256 image is processed as a 128×128 array of image pixel blocks, each block having four pixels. Each block has dimension of 2 pixels by 2 pixels. Each block is sequentially examined on the first of two passes (loops) through the blocked pixel data. The first block examined is chosen as a block representative of a pattern in the image. It is declared a code word block (or token or representative block) and is added to the codebook database. Each successive block is examined and a distortion is calculated between the examined block and each of the blocks in the code book. If the minimum distortion is less than a distortion limit, then the next block is examined. Otherwise, the examined block is declared a codeword and entered into the codebook. When all blocks have been examined on the first pass, then a second pass through all of the image pixel blocks is conducted. Each successive block is mapped into that codeword of the codebook for which the distortion is least. A second image is formed by assigning each constituent block pixel the index of the codeword. As a result, the second image contains index numbers at each pixel address. These numbers vary from 1 to the number of codewords in the codebook. The distortion measure used in the block comparisons is the sum of the mean squared pixel intensity differences over all of the 4 pixels of the two blocks being compared.The distortion limit used is established by training the recognizer to capture patterns of intensity due to road edges. The number of codewords is usually less than twenty (20). Those blocks which are outside the dual circular IR image band formed by the seeker are excluded from examination. The result is a pixel array in which each pixel is a class index. Region labeling, step 178, is performed on a pixel array using the connected components algorithm. Note that the connected components processing employed for the background discriminator is similar to that used for the target discriminator. The difference is that for the background discriminator the regions comprise contiguous sets of pixels having the same class index. Groups contiguous pixels with the same codeword labeling are established as regions to produce a third image, each pixel of which contains a region index label. A region in this image is thus a contiguous (connected) set of pixels having the same region index label and which together are surrounded by pixels with other region index labels. Thus the regions are labeled, area criteria are applied and regions that are too small are excluded from further analysis.

Seeker Scan Artifact Removal step 182, FIG. 15, screens regions to remove those which can result from image artifacts. An example of such an artifact is the DC offset that sometimes exists between sensor channels. This offset, together with variations in the returns from the background scene can create isolated regions in the segmented image which are highly elongated and would otherwise be candidates for a road edge. A scan modulation artifact increases or decreases the mean signal level in all or part of one or more of the detector output channels. This artifact appears as a circular band in the rectangular coordinate image. The code calculates the maximum and minimum radii, bddCylinder.rmax and bddcylinder.rmin, and the maximum and minimum angular extent of the region are also calculated according to FIG. 15A. These four parameters enclose a region being examined as a possible scan modulation artifact. Calculate delta radius which is equal to the difference of the maximum and minimum radii. If delta radius is less than a value of seven, then the region is declared a scan modulation artifact and eliminated from the list of road edge candidate regions. An additional test is performed since observed artifacts near the viewing center are wider than those seen near the edges of a circular scan. The elimination criteria is therefore broadened near the center. If the regions' minimum radius is less than 45 and if the delta radius is less than 12 then the region is declared a scan artifact.

Edge Slice Removal steps 184, FIG. 15 removes edge candidate regions created when a large infrared back-scatter pattern is scanned according to the circular seeker pattern. In such situations a slice of the pattern may appear near the edge. This region may pass the initial road edge selection criteria due to the local pattern and the features generated therefrom. To eliminate such artificially created candidates, we calculate the area for an ideal enclosing slice and then compare this area to the region's area as shown in FIG. 15B. The area of the triangular segment is op*rmin where op=sqrt( rmax2 -rmin2). The slice area is t*(rmax**2), where t=arctan(op, rmin). If the area of the candidate region is greater than 0.60 times the slice area, then the region is declared to be an edge slice artifact and removed from the list of candidates.

Prime edge detection 186, FIG. 15, examines each of the candidate regions not defined as a seeker scan artifact or an edge slice artifact to determine if the region might have been produced by a road edge. A prime edge is that detected edge candidate which is most likely to have been produced by a road edge in the background image. Those regions which qualify are then separated into one prime (highest confidence) edge and a group of secondary edge candidates called secondaries. To qualify as a road edge segment, a candidate region's elongation must be equal or greater than 0.60, the elliptical shape factor must be less than 5.0 and the region's area must be both greater than 15 and less than 5000. The elongation is calculated as

```
diffInert = sqrt(4*cij**2 + (ci2 - cj2)**2)
suminert = suminert = ci**2 + cj**2;
acdiff = ci2 - cj2;
diffInert = sqrt(4.0 * cij * cij + acdiff * acdiff)
spread = 2.0 * PI * suminert * reciprocalArea * reciprocalArea
elongation = diffInert/suminert
The elliptical shape factor, ellipseshapefactor[k], is calculated as
    suminert[k] = ci2 + cj2
    sa = 0.5*area[k]
    fm20 = ci2*suminert[k]
    fm02 = cj2*suminert[k]
    fm11 = cij* suminert[k]
    ss = fm20 + fm02
    sf = sqrt((fm20-fm02)**2 + 4*(fm11**2))
    semiminor[k] = sqrt( ( ss-sf)/sa)    //radius    p47
    semimajor[k] = sqrt ( ( ss+sf)/sa )
    ellarea= π* semiminor*semimajor
    semiminor[k] = 2.0 * semiminor[k] //diameter
    semimajor[k] = 2.0 * semimajor[k] //parameters of eq ellipse
    apb = semiminor[k] + semimajor[k]
    aqb = (semimajor[k]-semimor[k])/apb
    aqb2 = aqb**2
    aqb4 = (aqb)**4
    q64 = (64.0-3.0*aqb4)/(64.-16.0*aqb2)
    p2ae = ((π *apb*q64)**2)/ ellarea
    p2a = (perimeter**2)/area[k]
    ellipseShapeFactor[k] = p2a/p2ae;
```

The number of secondaries passing this criteria is counted and is set equal to nsecondaries. To qualify as the prime edge candidate, a region must have the greatest elongation of all of the edge candidates and the elongation value must be greater than 0.90.

When such evidence is found, a secondary region analysis step 188, FIG. 15, is conducted to determine the confidence associated with the prime edge candidate detection. Secondary region analysis identifies those candidate regions that are approximately oriented in the same direction as the prime edge region candidate. It then counts the number of regions which pass the secondary orientation criteria. This count is later used to calculate a confidence score. A region is a supporting candidate region if the region's orientation differs from that of the prime edge candidate by the value orientation.delta. (See FIG. 15C.) The orientation is calculated as $$cij = \text{over all } x,y \text{ in region } [k], \sum (x - \mu \cdot x)(y - \mu \cdot y)$$

$$ci2 = \text{over all } x,y \text{ in region } k, \sum (x - \mu \cdot x)^{**}2$$

$$cj2 = \text{over all } x,y \text{ in region } k, \sum (x - \mu \cdot y)^{**}2$$

$$\text{shape} \cdot \text{orientation}[k] = \arctan(2^* cij/(ci2 - ci2))$$

The number of secondary regions found and the percentage of those regions which exhibit an orientation similar to the prime edge are used to qualify the edge identification score. The difference between the maximum likelihood track orientation calculated from Viterbi feature tracker 174 and the prime edge candidate orientation is calculated. (See FIG. 15C.) This difference called the track orientation delta is used in the calculation of the confidence score in step 194. Road declaration and confidence calculation, step 194, is performed to evaluate a confidence score. If a region passes the prime region candidate score, then a road edge is declared. The recognizer may have more or less confidence in this declaration depending on how closely the selected road edge features correspond to those of the ideal road edge. This declaration confidence is expressed as a score which is calculated as score=alpha* (elongation of prime region)+beta* ((nsec-nsupportsec)/nsupportsec) +gamma* abs(track.orientation.delta), where abs( ) indicates the absolute value of the argument. This score is passed along with the prime region centroid and other data to the image analysis logic, step 196.

Viterbi feature tracker 174, FIG. 15, is used to examine patterns of diffuse imagery for evidence of road edges. The vector quantization segmentation process used to establish regions for pattern analysis tends to break up extended background objects. The Viterbi algorithm operates on original nonsegmented image data and has the ability to extend image pattern analysis across regions of low contrast and local variations in data scaling.

The first step is to smooth the data by grouping the pixels into contiguous, non-overlapping blocks of 2×2 pixel extent. Each block is ten represented for further analysis by replacing the block pixels with the block mean. Also, a 128×128 pixel image is reduced for analysis purposes to a 64×64 pixel image.

The initial position for the Viterbi tracker is calculated by first determining from the orientation of the prime edge candidate, the orientation of the expected road edge in the image. The y axis of the image is then set so that the expected road edge orientation is within +−45 degrees of the Y axis. This is accomplished by comparing the prime edge orientation with the Y axis orientation and if the magnitude of the difference is greater than 45 degrees, the image is rotated by 90 degrees.

The Viterbi tracker starts at row ri currently set to 20. The previous rows are not used because the image is circular rather than rectangular and the path metric array, discussed below, must remain within the image. The Y position is that pixel nearest to the intersection of the prime edge orientation line (axis of minimum inertia) and the pixel row ri. The algorithm then examines subsequent rows of image data to determine the maximum likelihood road edge path.

The maximum likelihood edge path through the image data is determined by the use of a path metric 2-D array as shown in FIG. 15D. The path metric array position pm(33,1) is positioned congruent with the block initial position of the Viterbi tracker within the image. The purpose of the array is to store accumulated path metrics as the examination of the road edge evidence proceeds row by row through the image. At each additional row the pixel blocks considered extend to the right and to the left by one block. Thus, row 21 for example examines three blocks of image pixels and accumulates metric for three possible paths. This expansion is based on the track progression model that the edge appearing in block j at row I can progress at a maximum of +_45 degrees and will therefore be found at blocks j−1, j or j+1 at row I+1.

Currently, the Viterbi path metric array is examined to a depth of 9 rows. At each row of the array, kk, there are 2kk−1 path metrics which are calculated.

At each row of depth kk, the maximum predecessor accumulated path metric is found for each of the blocks in the row. This value is determined by examining those blocks in row kk−1 at positions jj−a, ji, and jj+1 if those blocks reside within the dimensions of the Viterbi path metric array. Note for example that position pm(36,4) shown in FIG. V1 has only one possible predecessor at position pm(35,3). once the maximum predecessor accumtuated path metric value has been found, that value is then incremented by the path metric for the row kk to row kk+1 transition. Since the road edge is assumed to migrate to position jj−1, jj, or to ji+1 as it moves to row kk+1, the path metric for the row transition is simply the value of the block image congruent with the path metric array position termed I(kk,jj). Thus, the path metric entered at position kk,jj is the maximum predecessor path metric,pm.max(kk−1,jj)+I(kk,jj). The calculation of the path metric accumulation proceeds until the entire array is filled.

The Viterbi tracker then scans the final row of the path metric array for the maximum path metric value. This value is associated with the termination of the maximum likelihood path. To establish the coordinates for all those blocks which reside on the maximum likelihood path, the Viterbi tracker back tracks to the root node of the array. For the maximum likelihood node of the last row, each of the possible predecessor nodes is examined to determine the maximum path metric node. This node then resides on the maximum likelihood path and its coordinates are stored. Again in an iterative fashion, the maximum likelihood predecessor node for the previous row is examined, the node's coordinates are stored in a path location of size 2× array depth. In like fashion, each row kk−1 is examined until the root node of the path metric array is encountered at location 33,1. The path location array then contains the maximum likelihood road edge path through the imagery.

Finally, the maximum likelihood Viterbi track orientation is calculated as the slope of a line between the initial and the final coordinates. This orientation is used to modify the score of a road edge which has an associated prime road edge candidate object.

Background discriminator logic 166, FIG. 15, operates in parallel with target discriminator logic 136 and processes both mid and far band image data when both are available, accepts seeker image data 36 and first determines whether the image is valid based on the assumed clutter pattern, step 172. If the image is valid, it is then processed in parallel using two methods: Viterbi feature tracking, step 174 and vector quantization (VQ) Segmentation, step 176. The purpose of both methods is to determine whether road edge candidates exist in the seeker image.

Viterbi feature tracking, step 174, tracks line features through the original image and determines the competence with which these line features represent a road edge. This type of tracker is useful where variations in the original infrared reflectivity disturbances and the road edge itself lead to a fragmented set of regions being formed by the vector quantization segmentation process. Also, the Viterbi tracker can perform when DC offsets between sensor channels create ridges between road region segments that otherwise might not be associated at the segmentation level. The features calculated from the Viterbi track are the track centroid and the track orientation.

Background input data graph 168, FIG. 16, shows how vector quantization (VQ) segmentation is used to map areal image data to a set of class levels 167*a–f*, forming a pixel array of background data which is then processed by the connected components algorithm to produce, regionalized background data 120. The number of class levels is variable and depends on the image being processed.

In the vector quantization segmentation process, step 176, the image is examined on a block basis to determine kinds of variation which indicate the likely presence of roads. Each block is codified into a small set of local image representation blocks which are subsequently mapped to class levels 167*a–f* in a way which results in the least distortion. The result is a pixel array in which each pixel is a class index. Region labeling, step 178, is performed on a pixel array using the connected components algorithm. Note that the connected components processing employed for the background discriminator is similar to that used for the target discriminator. The difference is that for the background discriminator the regions comprise contiguous sets of pixels having the same class index. Thus the regions are labeled, area criteria are applied and regions that are too small are excluded from further analysis. The resulting labeled set of regions is screened to remove regions which can result in image artifacts. An example of such an artifact is the DC offset that sometimes exists between sensor channels. This offset, together with variations in the returns from the background scene can create isolated regions in the segmented image which are highly elongated and would otherwise be candidates for a road edge. If a region does not occupy at least two sensor channels then it is removed as being an artifact, step 182. Edge/artifacts, which can be created by the image segmentation process if a strong road edge forms a region boundary by the road edge and the circular edge of the seeker image, are removed by the edge/removal algorithm which requires that a candidate edge region occupy less than a fixed percentage of the circular segment opposite to and delimited by that candidate region. The remaining regions are examined for evidence of a prime edge, step 186. When such evidence is found, a secondary region analysis is conducted to determine the confidence associated with the edge detection, step 188. The number of secondary regions found and the percentage of those which exhibit an orientation similar to that of the prime edge are used to qualify the edge identification score. The track centroid and track orientation calculated from the Viterbi feature tracker 174 are correlated with the secondary regions found, step 192. A road declaration and confidence calculation, step 194, is performed using preselected weights, the elongation, the Viterbi track orientation angle and the percent of aligned secondary support regions to evaluate the centroid orientation and confidence score which are then passed on to the image analysis logic, step 196.

Image analysis logic block diagram 190, FIG. 17, shows how the target detector and the background detector data from both the far and the mid band are merged to form prioritized target list 50. Tactical data 56 comprises vectors of weights based on terrain and weather conditions which are expected in the area of possible targets. Acquisition scene database (ASD) 192 comprises the collection of target candidates determined by target recognizer 38, based on image snapshots 36 from each scan of target area 22. ASD 192 includes such information as candidate target location and score, candidate target signal-to-noise ratio (SNR), road region location and orientation, and road region confidence.

Mid band target candidates 44*a* from mid band target discriminator 40*a* and mid band background terrain characteristics 46*a* from mid band background discriminator 42*a* are merged in step 41, FIG. 17, by spatially correlating target candidate data determined by the target discriminator and the road evidence data determined by the background discriminator for each scan. The road presence confidence and location determined for a scan by the background discriminator are used to provide a multiplicative weight used to multiply the score of the target candidates determined by the target discriminator. The result of the merging is a modification to the score of target candidates in the ASD on a scan-by-scan basis resulting in far band target/terrain candidate data 45.

Far band target candidates 44*b* from far band target discriminator 40*b* and far band background terrain characteristics 46*b* from far band background discriminator 42*b* are merged 43 by spatially correlating candidate target data determined by the target discriminator and road evidence data determined by the background discriminator for each scan. The road presence confidence and location determined for a scan by the background discriminator are used to provide a multiplicative weight used to multiply the score of the candidate targets determined by the target discriminator. The result of the merging is a modification to the score of candidate targets in the ASD on a scan-by-scan basis resulting in far band target/terrain candidate data 47.

Mid band data 45 and far band data 47 are then processed by mid band/far band merge device 49, which employs a two color data merger algorithm to produce one composite list of target candidates 51. One of the two bands, mid or far, is selected as the preferred band of operation as provided in the tactical download data 56. This selection is based on predicted deployment conditions. The target candidate list for the preferred band, here taken as the mid band, is scanned from the first to the last target candidate. For each such candidate in the preferred band, all of the candidates in the alternate band (in this case the far band), for the same scan image only are examined, from first to last to determine if each alternate band candidate is within a geometric distance of Da from the preferred band candidate. If such an alternate band candidate is not within a distance Da from the preferred band candidate [k] under consideration, then the comparison proceeds to the next candidate in the alternate band candidate list. Otherwise, if the alternate band candidate is within the distance Da and the in same scan, then the band contrast ratio, bcRatio[k]<crMax, then crMin=bsRatio[k] is updated. In this fashion, the bcRatio[ ] for all of those alternate band candidates associated by distance with candidate j is determined. For each alternate band candidate, i, associated with preferred band candidate k, the score of candidate k is also increased by b percent where b, a parameter, is currently set to 10. When all associated alternate band candidates have been found and if at least 1 has been found, then the contrast ratio for the candidate k is set to bcRatio[k]=crMin. Note that a single alternate band candidate, i, may be associated with one or more primary band candidates, k. Processing is completed when all of the primary band target candidates have been utilized to produce the list of target candidates 51.

Merge scan candidates device 53 creates a composite target candidate list 52. After merging of the target and background data from each of the mid and far bands, and after merging the data from the mid and the far band composite target candidate lists, a set of target candidates and their associated records has been established. Each candidate is represented by an index number 1 through n, where n is the number of candidates. Multiple candidates can be produced by one real target. For example, with a single scan image a target return may be fragmented due to the multiple heat sources on the target. Also a single target viewed across multiple scans may have moved and again several target candidate records may be generated for the one target. It is therefore important to collect and merge target candidates likely representing one real target to produce one target candidate record for subsequent processing.

To merge the target candidates, all of the n candidates are associated with each other into m groups, m<n. Each of the mutually exclusive groups is an equivalence class and membership within the group is based solely on geometric proximity within the multiple scan field of view. Thus, if two target candidates are positioned at locations which differ by a Euclidean distance less than a distance threshold, Dt, then the two candidates are associated or equivalent and hence are members of the same equivalence class. Note that all members of an equivalence class of target candidates do not have to be within Dt pixels of all of the other members but only within a Dt pixel distance from one of the other target candidates of the class.

To associate the candidates into m groups, each of the indexed target candidates is iteratively considered. The first target candidate in the list of target candidates is first considered in this iteration and is assigned equivalence class index 1. The second target candidate is considered in the second iteration. The second candidate is first assigned to be the root of the second equivalence class by setting its equivalent class pointer to its own index number. If however this second candidate is positioned at an Euclidean distance less than Dt from the first class, then the equivalence class pointer for candidate 1 is changed to point to candidate 2 and both target candidate 1 and target candidate 2 are then in the same equivalence class. Each subsequent target candidate is considered for equivalence class membership, one such candidate being considered on each iteration. On each iteration every previously considered, j, is examined in order from the lowest indexed candidate to the candidate preceding the new entrant, indexed k-1. Each previously examined candidate, j, enters the current iteration for comparison in one of two states. It may be a root node of an equivalence class and its equivalence class pointer therefore points to itself. It may otherwise be a child member of the equivalence class whose equivalence class pointer points to another class member. That member may point to the root member. Thus the equivalence class has at most two levels of inheritance on entry into each iteration stage. In the first step of the iteration stage, the member's pointer is set to point to the root node of its equivalence class. In the second step the kth iteration candidate is compared to candidate j. If the candidates are equivalent, then the equivalence class root pointer is changed to point to candidate j and the next previously considered candidate is examined. The process continues until all j-1 of the previously considered candidates have been compared and then in like fashion until all j candidates have been processed. In one final subsequent step, the pointer of all of those target candidates which do not point to their root member, t, point to the class root. The result is that every target candidate 1 through j is ascribed a pointer of value I 1<I<=n which indicates its membership in equivalence class I.

The significant aspect of this algorithm is that all target candidates which are located within Dt pixels of each other are associated into one equivalence class. Each of the equivalence classes is taken to represent one actual target. The multiple target candidate data records/objects result from multiple views of a still object, from observing multiple pieces of an object viewed within one look and from multiple objects generated at various sequential locations from moving target. FIG. 17A shows examples of resulting associations in clusters for various hypothetical dispersions of target components. Note that the associations of target candidates proceed sequentially across the scene of target objects.

Since each class is assumed to represent one target, a subsequent step is to merge all of the target candidate data from each equivalence class into a common data record which represents the characteristics of the composite database. For each equivalence class, the composite target candidate is formed by this process assigns the coordinates of the ith composite target to be the last observed coordinates of any of the target candidates of the equivalence class, I. The score and signal-to-noise ratio of the combined class is the maximum of the members' score and SNR respectively. New features are also constructed for the group. The first is the number of members in the class and the other consist of the maximum, minimum mean and standard deviation of the intra-class distances. When all candidate target data is merged, a new target list is produced consisting of the merged equivalence classes.

Sort scan candidate step 57 sorts the candidates in decreasing attack priority order. This step uses the heap sort algorithm to sort the target candidates in order of highest to lowest score. The reindexed target candidate list containing priority ordered target candidate data records is then reported out of the recognizer.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An imaging target detection system comprising:
    scanner means for producing an image of a target area;
    target discriminator means including target segmentation means for identifying image pixels of similar intensity levels; target regionalization means for grouping into regions contiguous pixels of similar intensity levels; means for calculating a set of features for each target region; and means, responsive to said features, for qualifying regions as target candidates;
    background discriminator means including background segmentation means for identifying image pixels of similar intensity levels; background regionalization means for grouping into regions contiguous pixels of similar intensity levels; means for calculating a set of features for each background region; and means, responsive to said features, for qualifying background regions as terrain characteristics; and
    image analysis logic means responsive to said qualified terrain characteristics and qualified target candidates for determining and prioritizing targets.

2. The imaging target detection system of claim 1 in which said target discriminator means includes cumulative distribution function segmentation means.

3. The imaging target detection system of claim 1 in which said background discriminator means includes vector quantization segmentation means.

4. The imaging target detection system of claim 1 in which said means for calculating a set of features for each target region includes means for eliminating regions containing above and below a predetermined number of pixels.

5. The imaging target detection system of claim 1 in which said means for calculating a set of features for each background region includes means for eliminating regions containing above and below a preselected number of pixels.

6. The imaging target detection system of claim 1 in which said background discrimination means includes Viterbi tracker means for detecting a track in the pixels of the images, and said means for qualifying background regions is responsive to said Viterbi tracker means and said means for calculating a set of features for each background region, for qualifying background regions as terrain characteristics.

7. The imaging target detection system of claim 1 in which said scanner means includes a scanning device for providing a signal representative of the target area and geometric transform means for converting said signal into an image of the target area.

8. The imaging target detection system of claim 1 in which said image includes at least two images of different colors.

9. The imaging target detection system of claim 8 in which said different colors are in the mid and far infrared wavelength.

10. The imaging target detection system of claim 8 which includes a target discriminator means and a background discriminator means for each color image.

11. The imaging target detection system of claim 1 in which said image analysis logic means provides a confidence level for prioritizing targets.

12. A missile imaging target detection system comprising:

scanner means for producing an areal image of a target area;

target discriminator means including target segmentation means for identifying image pixels of similar intensity levels; target regionalization means for grouping into regions contiguous pixels of similar intensity levels; means for calculating a set of features for each target region; and means, responsive to said features, for qualifying regions as possible targets;

background discrimination means including background segmentation means for identifying image pixels of similar intensity levels; background regionalization means for grouping into regions pixels of similar intensity levels; means for calculating a set of features for each background region; and means, responsive to said features, for qualifying background regions as terrain characteristics; and image analysis logic means responsive to said qualified terrain characteristics and qualified possible targets for determining and prioritizing targets.

13. A method for imaging target detection, comprising:

scanning a target area to produce an image of the target area;

discriminating a target by identifying image pixels of similar intensity levels; grouping contiguous pixels of similar intensity levels into regions; calculating a set of features for each region; and qualifying regions as possible targets, in response to said features;

discriminating the background by identifying image pixels of similar intensity levels; grouping contiguous pixels of similar intensity levels into regions; calculating a set of features for each background region; and qualifying background regions as terrain characteristics in response to said features; and analyzing said qualified terrain characteristics and target candidates to determine and prioritize targets.

14. The method for imaging target detection of claim 13 in which discriminating a target includes segmenting according to a cumulative distribution function.

15. The method for imaging target detection of claim 13 in which discriminating a background includes segmenting with vector quantization.

16. The method for imaging target detection of claim 13 in which calculating a set of features for each target region includes eliminating regions which contain above a first predetermined number of pixels and below a second predetermined number of pixels.

17. The method for imaging target detection of claim 13 in which calculating a set of features for each background region includes eliminating regions which contain above a first preselected number of pixels and below a second preselected number of pixels.

18. The method of imaging target detection of claim 13 in which said discriminating the background includes Viterbi tracking for detecting a track in the pixels of the images, and qualifying background regions includes correlating the Viterbi tracking and the set of features calculated for each background region, for qualifying regions as terrain characteristics.

19. The method for imaging target detection of claim 13 in which said scanning includes producing a signal representative of the target area and geometrically transforming said signal into an image of the target area.

20. The method of imaging target detection of claim 13 in which said image includes at least two images of different colors.

21. The method of imaging target detection of claim 20 in which said different colors are in the mid and far infrared wavelength.

22. The method of imaging target detection of claim 20 in which discriminating a target and discriminating the background are performed for each color image.

23. The method of imaging target detection of claim 13 in which said image logic analyzing provides a confidence level for prioritizing targets.

24. A method for missile imaging target detection, comprising:

scanning a target area to produce an image thereof;

discriminating a target by identifying image pixels of similar intensity levels; grouping contiguous pixels of similar intensity levels into regions; calculating a set of features for each region; and qualifying regions as possible targets, in response to said features;

discriminating the background by identifying image pixels of similar intensity levels; grouping contiguous pixels of similar intensity levels into regions; calculating a set of features for each background region; and qualifying background regions as terrain characteristics in response to said features; and analyzing said qualified terrain characteristics and target candidates for determining and prioritizing targets.

* * * * *